(12) United States Patent
Krisko et al.

(10) Patent No.: US 12,366,109 B2
(45) Date of Patent: Jul. 22, 2025

(54) METHOD OF PROVIDING EDGE SEAL FOR VACUUM INSULATED GLASS UNIT

(71) Applicant: VKR Holding A/S, Hørsholm (DK)

(72) Inventors: Annette Johncock Krisko, Prarie du Sac, WI (US); Peter Sønderkær, Hørsholm (DK); Karsten Hansgaard Nielsen, Hørsholm (DK); Henrik Aslak Jensen, Hørsholm (DK); Timothy Alan Dennis, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 585 days.

(21) Appl. No.: 17/290,820

(22) PCT Filed: Nov. 5, 2019

(86) PCT No.: PCT/DK2019/050333
§ 371 (c)(1),
(2) Date: May 3, 2021

(87) PCT Pub. No.: WO2020/094198
PCT Pub. Date: May 14, 2020

(65) Prior Publication Data
US 2021/0371333 A1    Dec. 2, 2021

(30) Foreign Application Priority Data
Nov. 7, 2018  (DK) .................................. 201870733

(51) Int. Cl.
*E06B 3/673*     (2006.01)
*B05C 5/02*      (2006.01)
(Continued)

(52) U.S. Cl.
CPC ............ *E06B 3/673* (2013.01); *B05C 5/0204* (2013.01); *B05C 11/1002* (2013.01);
(Continued)

(58) Field of Classification Search
CPC ............... B05C 5/0204; B05C 11/1002; B05C 11/1023; B32B 17/10302; E06B 3/67326
See application file for complete search history.

(56) References Cited

U.S. PATENT DOCUMENTS

| 5,985,069 A | 11/1999 | Kawabe |
| 9,556,061 B2 | 1/2017 | Naito |

(Continued)

FOREIGN PATENT DOCUMENTS

| EP | 2851350 A1 | 3/2015 |
| JP | 1140054 A | 2/1999 |

(Continued)

OTHER PUBLICATIONS

International Search Report for corresponding application PCT/DK2019/050333 filed Nov. 5, 2019; Mail date Feb. 6, 2020.

(Continued)

*Primary Examiner* — Scott W Dodds
(74) *Attorney, Agent, or Firm* — CANTOR COLBURN LLP

(57) ABSTRACT

The present disclosure relates to a method of applying a seal material on a glass sheet surface of one or more tempered glass sheets for a vacuum insulated glass unit. The method comprises the steps of: obtaining by means of a sensor system (4) surface variation data of at least one tempered glass sheet (3, 30) for said a vacuum insulated glass (VIG) unit, and applying seal material (2) for an edge seal at a surface (3a, 30a) of said one or more tempered glass sheet (3, 30) by means of one or more nozzles (5) having a nozzle opening (6) for dispensing said seal material. The method further comprises by means of a control system (7) controlling one or more adjustment systems (9, 10, 11) influencing on the applying of said seal material by said one or more nozzles (5) based on said obtained surface variation data. The disclosure additionally relates to a method of manufac- (Continued)

Figure 1:
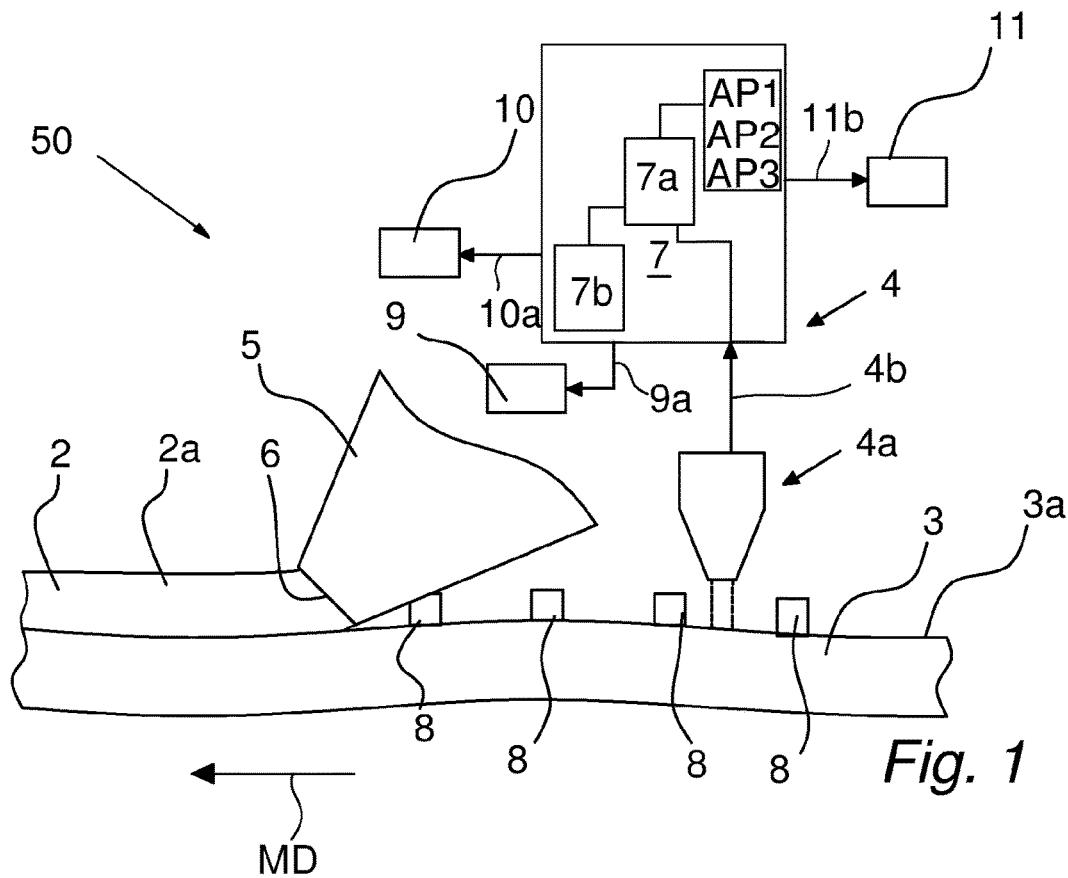

turing a vacuum insulated glass (VIG) unit, and a system for applying edge sealing material (2) for an edge sealing of a vacuum insulated glass unit (1, 100) and use of a system for applying edge sealing material (2) for an edge sealing of a vacuum insulated glass unit (1, 100).

16 Claims, 10 Drawing Sheets

(51) Int. Cl.
     *B05C 11/10*      (2006.01)
     *B32B 17/10*      (2006.01)
     *B32B 37/12*      (2006.01)
     *E06B 3/66*      (2006.01)

(52) U.S. Cl.
     CPC .... *B32B 17/10302* (2013.01); *B32B 37/1284* (2013.01); *E06B 3/6612* (2013.01); *E06B 3/67334* (2013.01); *B05C 11/1018* (2013.01); *B05C 11/1023* (2013.01); *B32B 17/10972* (2013.01); *B32B 2307/304* (2013.01); *B32B 2307/412* (2013.01); *E06B 3/67326* (2013.01)

(56) References Cited

U.S. PATENT DOCUMENTS

| | | | |
|---|---|---|---|
| 2002/0132038 A1* | 9/2002 | Birmingham | B05C 5/0216 |
| | | | 427/8 |
| 2005/0217319 A1 | 10/2005 | Yoshizawa | |
| 2014/0154436 A1 | 6/2014 | Cooper | |
| 2015/0068665 A1* | 3/2015 | Abe | C03C 27/06 |
| | | | 156/109 |

FOREIGN PATENT DOCUMENTS

| | | | |
|---|---|---|---|
| JP | 2018066975 A | 4/2018 | |
| WO | 2013180998 A1 | 12/2013 | |
| WO | WO-2018204671 A1 * | 11/2018 | B05C 11/1005 |

OTHER PUBLICATIONS

Written Opinion of the International Searching Authority for corresponding application PCT/DK2019/050333 filed Nov. 5, 2019; Mail date Feb. 6, 2020.

* cited by examiner

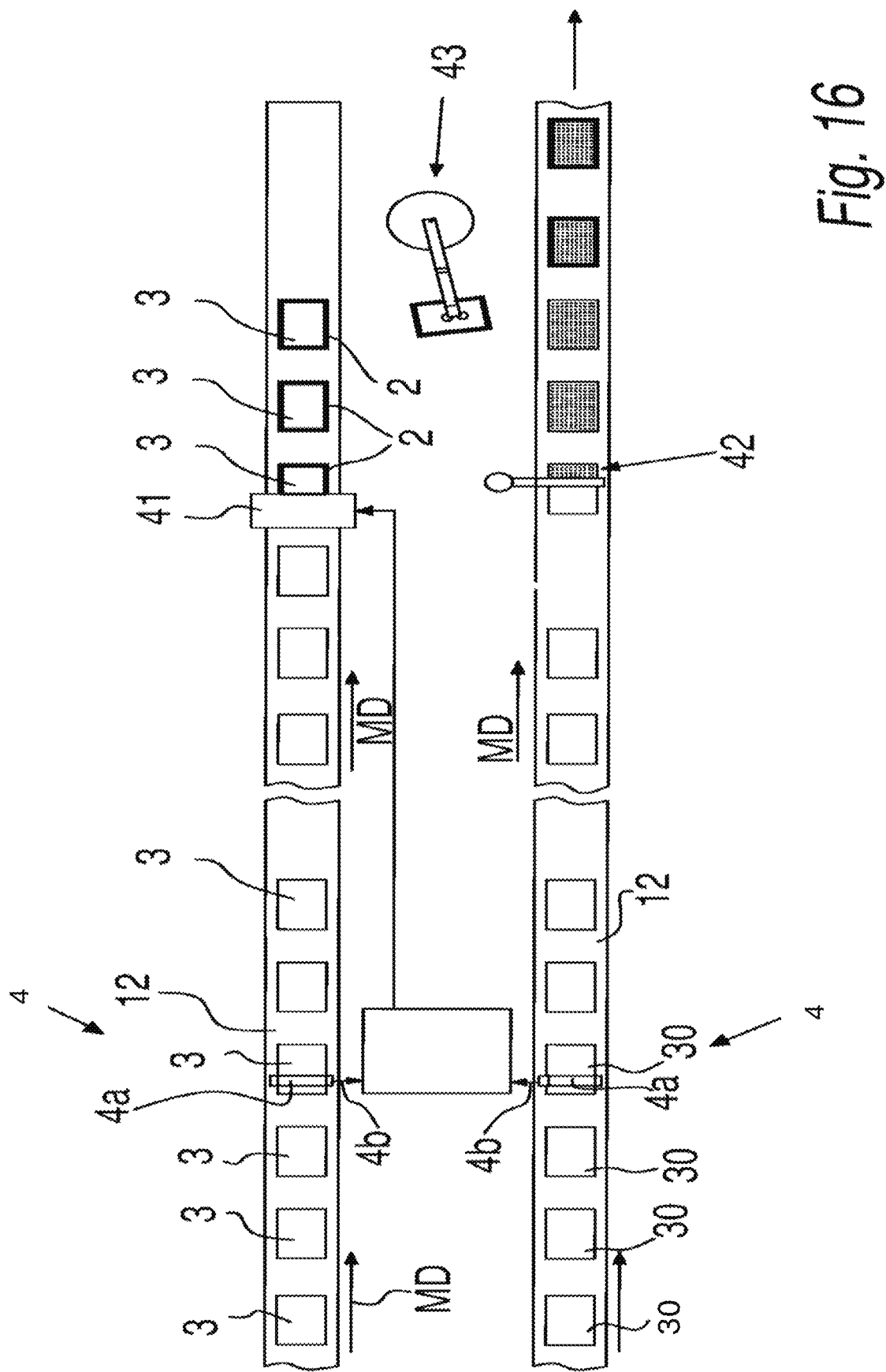

METHOD OF PROVIDING EDGE SEAL FOR VACUUM INSULATED GLASS UNIT

The present disclosure relates to a method of applying a seal material on a glass sheet surface of one or more tempered glass sheets for a vacuum insulated glass unit, a method of manufacturing a vacuum insulated glass unit, and a system for applying edge sealing material for an edge sealing of a vacuum insulated glass unit.

BACKGROUND

Vacuum insulated glass (VIG) units provides several advantages such as good insulated properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document no. EP2855816 describes a VIG unit and method for manufacturing a VIG unit, where a side/edge seal material, such as solder glass type material, is arranged on a glass surface so that applied seal material is of a pre-selected dispensed height. Patent document no. US2005217319 describes a VIG unit, having an interior gap sealed by a low melting point glass frit material by means of a dispenser unit.

Applying the edge sealing material may suffer from drawbacks such as e.g. providing VIG units having an uneven edge seal width, and/or using a relatively large usage of edge sealing material. The present disclosure may e.g. disclose solutions for larger scale manufacturing which may for example provide a more smooth/straight edge sealing, a good bonding strength between the edge sealing and VIG glass sheets and/or a solution wherein a reduced amount of sealing material may be used for the edge seal without compromising the edge sealing efficiency.

SUMMARY

In a first aspect, the present disclosure relates to a method of applying a seal material on a glass sheet surface of one or more tempered glass sheets for a vacuum insulated glass unit, wherein the method comprises the steps of:
  obtaining by means of a sensor system surface variation data of at least one tempered glass sheet for said a vacuum insulated glass unit, and
  applying seal material for an edge seal at a surface of said one or more tempered glass sheets by means of one or more nozzles having a nozzle opening for dispensing said seal material,
  wherein said method further comprises by means of a control system controlling one or more adjustment systems influencing on the applying of said seal material by said one or more nozzles based on said obtained surface variation data.

Tempered glass sheet may suffer from varying surface variations, among others due to so called roller waves/distortion originating from the manufacturing of the tempered glass sheets prior to applying the seal material. Additionally, other surface variations may occur such as edge kink and/or more "global" bending/kink of the tempered glass sheet. These surface variations may vary from glass sheet to glass sheet, and may vary dependent on along which end edge surface of the glass sheet the seal material is applied.

By adapting/controlling one or more parameters configured to control the applying of the seal material based on surface variation data obtained from a sensor system, and thus control one or more adjustment systems, several advantages may be obtained. For example, an individually adapted edge sealing having dimensions and/or other characteristics that may be desired may be obtained. For example, it may in one or more aspects of the present disclosure provide an edge sealing of the final VIG unit that has a reduced width and/or width variation, and at the same time provide a sufficient and long lasting sealing.

For example, adjusting one or more of such parameters may spare the needed amount of edge seal to provide a sufficient edge sealing bonding. Also or alternatively, it may help to provide a solution wherein a more thin and/or straight edge seal may be obtained at the final VIG unit after two glass sheet have been mated/paired together so that the edge seal seals a gap between the glass sheets. This may e.g. be obtained due to that the system may individually compensate/adjust for surface variations based on surface variation data relating to one or more glass sheets to be paired, by adapting/adjusting the one or more applying parameters based on the surface variation data.

For example, a control system may in one or more aspects of the present disclosure provide said adjustment of the one or more applying parameters based on said surface variation obtained by means of input from one or more sensors.

In one or more aspects of the present disclosure, the sensor system may obtain measurements for providing said surface variation data, during a relative displacement between a sensor of the sensor system and a tempered glass sheet to be applied with the seal material by means of said one or more nozzles.

In one or more aspects of the present disclosure, the sensor system may be configured to measure/provide input relating to surface variations at the part of the surface where the seal material for the edge sealing will subsequently be applied by the nozzle, or near this part, such as within 10 cm, e.g. within 5 cm, e.g. within 1 cm from the surface where the seal material for the edge sealing will subsequently be applied by the nozzle.

It is generally understood that in one or more aspects of the present disclosure, said control of the one or more adjustment systems may be provided by the control system controlling one or more applying parameters based on said obtained surface variation data so as to control the one or more adjustment systems.

It is generally understood that as mentioned above, the present disclosure may in one or more aspects help to provide solution for applying a edge seal material on a glass sheet surface, where the edge seal width and/or variation in the edge seal width is reduced in the final, manufactured VIG unit after the gap between the VIG unit glass sheets has been evacuated and sealed and the seal has hardened/cured, due to e.g. a cooling after a heating of the edge seal material. In one or more aspects of the present disclosure, the variation in seal width may thus be reduced in the final VIG unit so that a seal portion defined along a length of e.g. at least 10 cm, such as a seal portion length between 10 cm and 15 cm, and measured along the neighbouring edge of the glass sheet, is less than 40%, such as less than 20%, e.g. less than 10% such as less than 8%. In one or more aspects of the present disclosure, the variation in the seal width in the final VIG unit may be obtained to be below 2.4 mm, such as below 1.8 mm, such as below 1.4 mm, such as below 1.0 mm, such as below 0.8 mm. In one or more embodiments, the variation in the seal width may be between 0.3-2.4 mm, such as between 0.5-1.8 mm, such as between 1-2 mm.

It is understood that the seal width variation may be calculated based on difference between the largest seal width and the smallest seal width measured along the length of the seal portion. For example, e.g. along a 10 cm seal portion, the smallest seal width may be measured as 4 mm and the largest seal width may be measured as 5 mm, providing a maximum of 20% variation in seal width along the specified seal portion.

It is understood that the seal width variation may be calculated based on difference between the largest seal width and the smallest seal width measured along the length of the seal portion. For example, e.g. along a 10 cm seal portion, the smallest seal width may be measured as 4 mm and the largest seal width may be measured as 5 mm, providing a maximum of 20% variation in seal width along the specified seal portion.

It is understood that in aspects of the present disclosure, the above mentioned method of applying a seal material on a glass sheet surface of one or more tempered glass sheets for a vacuum insulated glass unit may be part of a larger manufacturing process where vacuum insulated glass units are manufactured. This process may comprise one or more of the steps of pairing of glass sheets so that major surfaces of the glass sheets faces a gap wherein a plurality of support structures such as pillars are distributed to maintain the gap, evacuation of the gap between the glass sheets, heating/curing of the edge seal, sealing of the evacuated gap and/or the like.

In one or more aspects of the present disclosure, said sensor system obtains said surface variation data while the seal material is applied by said one or more nozzles.

This may e.g. provide an improved surface variation adaption/compensation and/or a faster and/or more space saving manufacturing process.

One or more sensors may thus e.g. be arranged ahead of/before, at/together and/or above the nozzle or nozzles so as to provide a measurement at a position of the glass sheet before the edge sealing material is applied, or substantially at the location where the material is applied, and a control system may process the input from the sensors and provide an applying parameter adjustment accordingly.

The one or more sensors of the sensor system and the one or more nozzles may in one or more aspects of the present disclosure be kept in a substantially fixed position relative to each other, at least so that the shortest distance between the two is kept substantially un-amended when providing said adjustment of the one or more parameters.

In one or more aspects of the present disclosure, said obtaining of the surface variation data by means of the sensor system, and/or said adjustment of said one or more applying parameters, may however be provided prior to initiating said applying of the seal material, and the measurement results or one or more driveable therefrom may be stored in a data storage for later use, and e.g. assigned an identification (ID) related to the glass sheet on which the measurement(s) was performed.

In one or more aspects of the present disclosure, said control of the one or more adjustment systems is provided while a relative displacement between said glass sheet and said one or more nozzles so as to apply said edge seal material, is provided.

For example, in one or more aspects of the present disclosure, said obtaining of the surface variation data by means of the sensor system, and said adjustment of one or more applying parameters may be provided during the same relative displacement between said tempered glass sheet and said nozzle and one or more sensors of said sensor system.

The mentioned relative displacement provided between said glass sheet and said one or more nozzles so as to apply the edge seal material is preferably provided in a direction substantially parallel to/along the major surface of the glass sheet so that the nozzle or nozzles can apply e.g. a strip of the sealing material for the edge seal.

In one or more aspects of the present disclosure, said control system, such as a closed loop control system,
- obtains surface variation data from one or more sensors of the sensor system,
- processes, by means of a data processor, said obtained surface variation data based on a regulation program code stored in a data storage, and
- provides said adjustment of one or more applying parameters based on said processing, thereby providing a control of one or more of said one or more adjustment systems influencing on the applying of said seal material.

This may e.g. help to provide a fast regulation solution which may be usable for larger scale manufacturing solution. The closed loop regulation system may e.g. be a PD or PID control that uses the obtained surface variation data to calculate an error based on one or more predetermined references, and based thereon adjusts the one or more applying parameters.

In one or more aspects of the present disclosure, said one or more adjustment systems influencing on the applying of said seal material comprises a dispenser distance adjustment system configured to control the dispenser distance defined between the nozzle opening and the glass sheet surface.

For example, in one or more aspects of the present disclosure, one or more motors such as stepper motors, or other types of motors e.g. combined with a gearing, may be arranged to control an adjustment system for controlling the dispenser distance, and by controlling the one or more motors by means of the control system, the distance between the nozzle opening and the glass sheet surface is regulated to match the desired distance.

Controlling the dispenser distance may e.g. help to provide that the seal material applied may have a more desired shape and/or dimensions which may in the end influent on the final VIG unit edge seal characteristics such as one or more of edge seal dimension(s), width variation, bonding properties and/or the like after the edge seal material has been heated and cured, and the gap between glass sheets of the final VIG unit has been evacuated and sealed.

In one or more aspects of the present disclosure, said control of the dispenser distance may be configured to be provided within an adjustment range (AR) of at least 0.2 mm, such as at least 0.3 mm, e.g. at least 0.4 mm.

This may help to provide a sufficient adjustment range that may be sufficient to adapt the dispenser distance to the surface variations.

The adjustment range may e.g. be even more, such as at least 1 mm, e.g. at least 2 mm.

In one or more aspects of the present disclosure, the adjustment range may be between 0.2 mm to 3 mm, e.g. in the range of 0.1 mm to 1 mm or in the range of 0.1 mm to 0.5 mm, so as to control the dispenser distance during for example a relative movement between the one or more nozzles and said tempered glass sheet.

The adjustment range may e.g. be configured so that the nozzle can be adjusted within this adjustment range with an adjustment resolution providing that a plurality of different predefined distance may be selected by the control system within the adjustment range. In one or more aspects of the present disclosure, said control of the dispenser distance may provide an adjustment with an adjustment resolution below 0.1 mm, such as below 0.08 mm, e.g. below 0.06 mm, e.g. within said adjustment range. For example, the adjustment in the adjustment range may be provided with a resolution determined by the adjustment precision of the displacement system. For example, a digitally controlled adjustment may be provided within the adjustment range.

In one or more aspects of the present disclosure, said one or more adjustment systems may comprise one or more adjustment systems controlled during the applying of the seal material based on said obtained surface variation data, so as to maintain a substantially constant, predefined distance between the nozzle opening and the glass sheet surface.

The inventors have found indications of a relationship between the nozzle opening distance and the applied seal material dimensions. If the nozzle opening is at a relatively large distance from the glass sheet surface, the shape of the seal material may undergo uncontrolled changes along the distance from the nozzle opening to the glass sheet surface. By controlling the distance to be substantially constant, e.g. by means of a method and/or a control system as described in more details above and/or below, based on the surface variation data, the control of the dimensions of the applied seal material may be improved, and this may e.g. result in sparing of edge seal material, a more narrow edge seal and/or an edge seal with reduced width variations.

In one or more aspects of the present disclosure, said one or more nozzles is/are arranged at a dispenser distance between 0.4 to 3 mm or such as between 0.5 to 2 mm, such as between 0.5 to 1.5 mm from said glass sheet surface when said seal material is dispensed.

Such a distance may be advantageous in order to provide an improved control and/or or reliability during the applying of the sealing material for the edge seal.

The dispenser distance between the nozzle opening and the glass sheet surface may in one or more aspects of the present disclosure be kept substantially constant by adjusting/controlling one or more applying parameters during the applying of the seal material, based on the surface variation data, so as to maintain a substantially constant, predefined distance within the above mentioned range or ranges. The The distance may however e.g. in further embodiments of the present disclosure not be varied/controlled by the control system, and may thus vary within e.g. the above mentioned ranges, as a relative displacement between the glass sheet surface and nozzle outlet is provided in a direction parallel to the major surface of the glass sheet during applying of the sealing material.

In one or more aspects of the present disclosure, said one or more controlled adjustment systems may comprise one or more adjustment systems configured to control the amount of seal material applied per length unit at said glass sheet surface by said one or more nozzles.

Thus, e.g. a varying amount of edge sealing material per length unit may be intentionally provided to e.g. help to compensate for surface variations such as roller waves, edge kink variations and/or the like.

This may e.g. help to provide an edge seal with one or more desired characteristics, such as adapted applied width and/or height that may be beneficial due to the surface variations of the surface of the glass sheet.

For example, in one or more aspects of the present disclosure, said one or more adjustment systems configured to control the amount of seal material applied per length unit at said glass sheet surface by said one or more nozzles comprises an adjustment system for adjusting the relative displacement speed between said one or more nozzles and the tempered glass sheet applied with said sealing material.

By regulating said displacement speed, more or less edge sealing material may be applied per length unit dependent on the speed, based on the surface variation data.

Also or alternatively, in one or more aspects of the present disclosure, said one or more adjustment systems configured to control the amount of seal material applied per length unit at said glass sheet surface by said one or more nozzles may for example comprise an adjustment system for adjusting the amount of seal material that is dispensed through the nozzle outlet per time unit.

By adjusting the amount of seal material that is dispensed through the nozzle outlet per time unit, e.g. controlled by a control system, a control of the amount of seal material applied per length unit at the glass sheet surface by said one or more nozzles may be provided based on the surface variation data. This adjustment may e.g. be provided during the applying of the seal material to vary the amount of seal material applied per length unit.

An adjustment system for adjusting the amount of seal material that is dispensed through the nozzle outlet may in one or more aspects of the present disclosure e.g. comprise a pressure arrangement or the like configured to press the seal material through the nozzle outlet, it may also or alternatively comprise a conveyer screw configured to be rotated, and dependent on the rotation speed of the conveyer screw (which may be an adjustment parameter to be controlled by a control system), the amount of material applied through the nozzle per time unit may be adjusted.

In one or more aspects of the present disclosure, said one or more adjustment systems configured to control the amount of seal material applied per length unit at said glass sheet surface by said one or more nozzles, is/are controlled so as to vary the height of the applied sealing material based on surface variation data obtained from one or more glass sheets.

This may provide a solution wherein the width variation of the edge sealing stripe may be reduced per length unit, as the edge sealing height has been adapted to surface variations of one or more glass sheet to be paired. Accordingly, when the glass sheets are paired, the gap distance at the area of the edge sealing may vary due to edge kink, roller waves and/or the like of the tempered glass sheets, but as the edge sealing has been applied based on the surface variation data, and the edge sealing height has been adapted accordingly, this varying gap distance may not influent on the edge sealing width, or the edge sealing width variation may at least be reduced.

The surface variation data may in one or more aspects of the present disclosure e.g. be obtained from the glass sheet surface to be applied with said edge sealing material, and e.g. also in further aspects of the present disclosure from a glass sheet surface of a further glass sheet to be paired with the glass sheet applied with the edge sealing material.

The control system may thus in one or more aspects of the present disclosure control the height of the applied sealing material so that it intentionally varies in the longitudinal direction of the edge sealing stripe(s) based on obtained surface variation data relating to the glass sheet on which the edge sealing material is applied and/or based on surface variation data of a glass sheet to be paired with the glass sheet on which the edge sealing material is applied.

In one or more further aspects of the present disclosure, said one or more adjustment systems configured to control the amount of seal material applied per length unit at said glass sheet surface by said one or more nozzles, may be controlled so as to maintain a substantially constant height of the applied sealing material based on surface variation data obtained from one or more glass sheets. This may e.g. be provided by adjust the nozzle-to-glass surface distance and/or other of the adjustment systems, to obtain a substantially constant height of the applied sealing material irrespectively of the surface variations of the glass sheet at which the edge seal material is applied.

In one or more aspects of the present disclosure, the amount of seal material that is applied per length for said edge seal is in the range of 0.01 g/cm (gram per centimetre) to 0.2 g/cm edge seal material, such as between 0.02 g/cm to 0.12 g/cm, e.g. between 0.04 to 0.10 g/cm edge seal material.

The amount applied may e.g. be kept substantially constant within said range, for e.g. an entire glass sheet, for a single or more than one stripe of edge seal of the glass sheet, or it may be adjusted during the applying of the edge seal material by adjusting one or more applying parameters configured to control the amount of seal material applied per length unit by said one or more nozzles based on the surface variation data, during applying a stripe of edge seal along an edge surface of the glass sheet. This amount may e.g. be adjusted based on the obtained surface variation data.

It is understood that the above mentioned weight per length of the edge stripe seal is the weight of the material substantially in the form and viscosity with which it leaves the nozzle, and before e.g. solvent, binder or other temporary additives (if present) are evaporated or burned out.

The amount may be measured/determined along the edge sealing stripe, for example over a length of 1 cm or 10 cm of the edge sealing stripe It is generally understood that in one or more aspects of the present disclosure, said method may comprise one or both of the steps of
a) controlling the dispenser distance defined between the nozzle opening and the glass sheet surface, based on said surface variation data, by means of a first adjustment system for controlling the dispenser distance, and
b) controlling the amount of seal material applied per length unit by said one or more nozzles based on said surface variation data by means of one or more adjustment systems.

In one or more aspects of the present disclosure, said sensor system comprises an optical measurement arrangement, such as one or more of:
a) one or more optical sensors and one or more light sources,
b) one or more image sensors such as Charge-coupled devices (CCD) sensors and/or
c) one or more focal detection systems Generally, said sensor system may in one or more aspects of the present disclosure be configured to determine a surface variation at the area of the surface to be applied with said edge seal material, and/or or one or more characteristic of the applied edge seal.

Electromagnetic sensor systems such as optical sensor systems may be advantageous as they may not require physical contact between the glass surface and the sensor system, and this may e.g. help to reduce the risk of contaminating the glass sheet surface and/or provide a system that is less likely to be damaged or fast worn so it need a repair or replacement.

In one or more aspects of the present disclosure, said nozzle opening of said one or more nozzles is an elongated nozzle opening.

This provides that the seal material is arranged on the glass sheet surfaces in an elongated shape substantially similar to or affected by the nozzle opening shape, which allows for the seal material to be arranged in a flat shape, with a larger width than height of the seal material.

For example, this may help to improve contact between the seal material and the glass surface(s) as a large amount of the material is in contact with the glass surface, and/or the large width and bonding area of the seal material compared to seal material applied by e.g. a round/circular nozzle outlet may facilitate a shorter bonding process.

In one or more aspects of the present disclosure, the nozzle opening may be of an aspect ratio between (16:1) to (48:1), such as between (24:1) to (40:1). The aspect ratio may be determined as the ratio of nozzle opening width to nozzle opening height, where the width is measured along the major axis of the opening and the height is measured along the minor axis of the opening.

However, it is understood that the nozzle opening in further aspects of the present disclosure may have other shapes such as circular, quadratic or polygonal shape and/or the like.

In one or more aspects of the present disclosure, the width of the nozzle opening is between 5-13 mm, such as between 6-12 mm, such as between 7-9 mm, and/or wherein the height of the nozzle opening, is between 0.1-1.5 mm, or such as between 0.1-0.6 mm or such as between 0.2-0.4 mm.

For example, in one or more aspects of the present disclosure, the nozzle opening may be of a height between 0.10-0.40 mm, or such as between 0.15-0.30 mm and wherein the nozzle opening is of an aspect ratio between (16:1)-(48:1) or such as between (24:1)-(40:1).

In one or more aspects of the present disclosure, the cross-sectional shape of the applied seal material is of an aspect ratio, being the ratio of width to height, that is between (5:1)-(20:1), such as between (8:1)-(16:1).

The aspect ratio is determined as the ratio of seal material width to seal material height, where the width is measured along a plane parallel to the major surface of the glass sheet on which the seal material is deposited, and the height is measured perpendicular to the interior major surface of the glass sheet.

In one or more aspects of the present disclosure, the applied seal material height is between 0.3-0.6 mm, or such as between 0.3-0.5 mm, or such as between 0.4-0.6 mm measured perpendicular to the surface, such as the major surface, of the glass sheet on which the seal material is applied, and/or wherein the applied seal material width is between 3-12 mm, such as between 4-10 mm, for example between 5-9 mm, e.g. between 4 mm to 8 mm measured along the surface, such as the major surface of the glass sheet on which the seal material is applied.

In one or more aspects of the present disclosure, the average seal material height h1 may vary by less than 30%, or such as by less than 25% along ¾ of the seal material width, where the ¾ part of the width is centred around the centre point half way through the total width of the seal material.

It is generally understood that the sealing efficiency of edge seal material applied near the edges of the glass sheets to seal the gap is critical to the lifetime of the final VIG unit.

The seal material may e.g. need to provide a hermetic seal maintaining a low pressure within in the gap of 10-4 bar or below, such as 10-3 mbar or below, and avoid mechanical breakage and accommodate glass sheet movement, which may e.g. occur due to impact or due to temperature differences between the glass sheets and generally different thermal expansion of the glass sheets.

It is moreover generally understood that among other or further requirements, the seal material may need to provide gas diffusion resistance. The level of diffusion through the seal may dependent significantly on the seal width. By the present disclosure, the final seal width may be more precisely controlled without having to use a large amount of seal material. The risk of gas diffusions may thereby be more precisely controlled already at the application stage of the VIG unit manufacturing process.

In one or more aspects of the present disclosure, the transverse cross-sectional shape of the applied seal material may be of a height between 0.4-0.6 mm and wherein the transverse cross-sectional shape of the applied seal material is of an aspect ratio, being the ratio of width (w1) to height (h1)-(w1:h1)-, which is between (5:1) to (30:1), or such as between (8:1) to (24:1) or such as between (10:1) to (20:1).

In one or more aspects of the present disclosure, said applied seal material, such as an edge seal material, is a low melting point solder glass material.

Glass edge sealing such as low melting point solder glass material may e.g. provide a good bonding and a strong edge sealing, and/or may comprise desirable characteristic in relation to controlling edge seal dimensions.

The low melting point solder glass material may e.g., in aspects of the present disclosure, comprise solvent, binder, a glass powder material and e.g. also further filler material such as e.g. ceramic material.

In a further aspect, the present disclosure moreover relates to a method of manufacturing a vacuum insulated glass (VIG) unit, wherein the method comprises the steps of:
  applying edge seal material at one or more glass sheets by means of a method according to one or more of the above mentioned aspects, providing support structures on the major surface of at least one of the glass sheets,
  pairing the one or more glass sheets provided with said applied edge sealing material with a further glass sheet so that the glass sheets are placed in parallel with interior major surfaces of the glass sheets facing each other and providing a gap therein between, and so that said support structures are placed in said gap, and
  evacuating and sealing said gap so as to provide said VIG unit.

Said pairing the one or more glass sheets may e.g. be provided at a pairing/mating station where panes are mated/paired to provide a VIG assembly which is then further processed to e.g. heat the edge sealing, and evacuate and seal the gap between the edge seals gap so as to provide the VIG unit.

If the edge sealing material is a glassy seal material, such as a low melting point glass material, the method may furthermore, in one or more aspects of the present disclosure comprise evaporating solvent of the applied edge seal material, burning out/removing a binder material and/or firing the glassy seal material to a point where it softens or melts. This may e.g. be provided before and/or during the evacuation of the gap, such as that the gap may e.g. be evacuated during cooling/temperature reduction of the edge sealing after firing the edge sealing material.

In a still further aspect, the present disclosure moreover relates to a system for applying edge sealing material for an edge sealing of a vacuum insulated glass unit, wherein said system comprises:
  a support base for a tempered glass sheet to be applied with an edge seal material,
  one or more nozzles for dispensing an edge seal material for an edge seal of a vacuum insulated glass unit,
  a displacement system configured to provide a relative displacement between the tempered glass sheet and the one or more nozzles,
  one or more adjustment systems configured to be controlled by a control system so as to control said dispensing of the seal material, and
  a sensor system configured to obtain surface variation data of a tempered glass sheet (3) to be applied with an edge seal material,
  wherein said control system is configured to control said one or more adjustment systems based on said obtained surface variation data.

Additionally, the present disclosure relates to a vacuum insulated glass unit comprising first and second glass sheets separated by support structures to provide a gap between the glass sheets, and an edge-sealing enclosing and sealing said gap, wherein said edge sealing is provided by means disclosed herein.

A seal portion of the edge seal of the vacuum insulated glass unit, defined along a selected length of e.g. at least 10 cm, such as a seal portion length between 10 cm and 15 cm, or alternatively a larger seal portion length, and measured along the neighbouring edge of the glass sheet, may in one or more aspects of the present disclosure be less than 40%, such as less than 20%, e.g. less than 10% such as less than 8%, and/or the variation in the seal width in the final VIG unit within said seal portion length may be below 2.4 mm, such as below 1.8 mm, such as below 1.4 mm, such as below 1.0 mm, such as below 0.8 mm. In one or more aspects of the present disclosure, the variation in the seal width may be between 0.3-2.4 mm, such as between 0.5-1.8 mm, such as between 1-2 mm.

The seal material width of the above mentioned seal portion of the final/finalized VIG unit is in one or more aspects of the present disclosure between 4-12 mm, such as between 5-9 mm, such as between 6-8 mm measured along the surface of the glass sheet on which the seal material is deposited/provided.

In a still further aspect, the present disclosure moreover relates to the use of a system for applying edge sealing material for an edge sealing of a vacuum insulated glass unit, wherein said system comprises:
  a support base for a tempered glass sheet to be applied with an edge seal material,
  one or more nozzles for dispensing an edge seal material for an edge seal of a vacuum insulated glass unit,
  a displacement system configured to provide a relative displacement between the tempered glass sheet and the one or more nozzles,
  one or more adjustment systems configured to be controlled by a control system so as to control said dispensing of the seal material, and
  a sensor system configured to obtain surface variation data of a tempered glass sheet to be applied with an edge seal material,
  wherein said control system is configured to control said one or more adjustment systems based on said obtained surface variation data.

FIGURES

Figure 2:
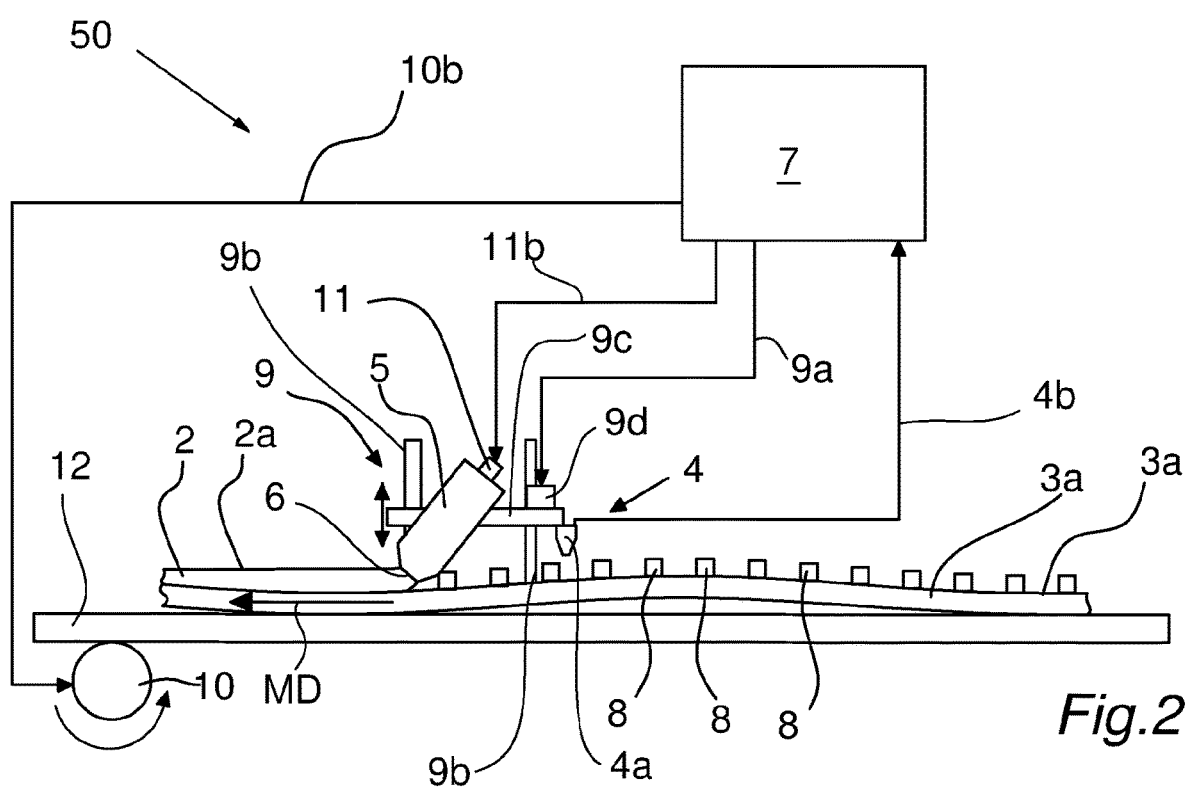
Figure 3:
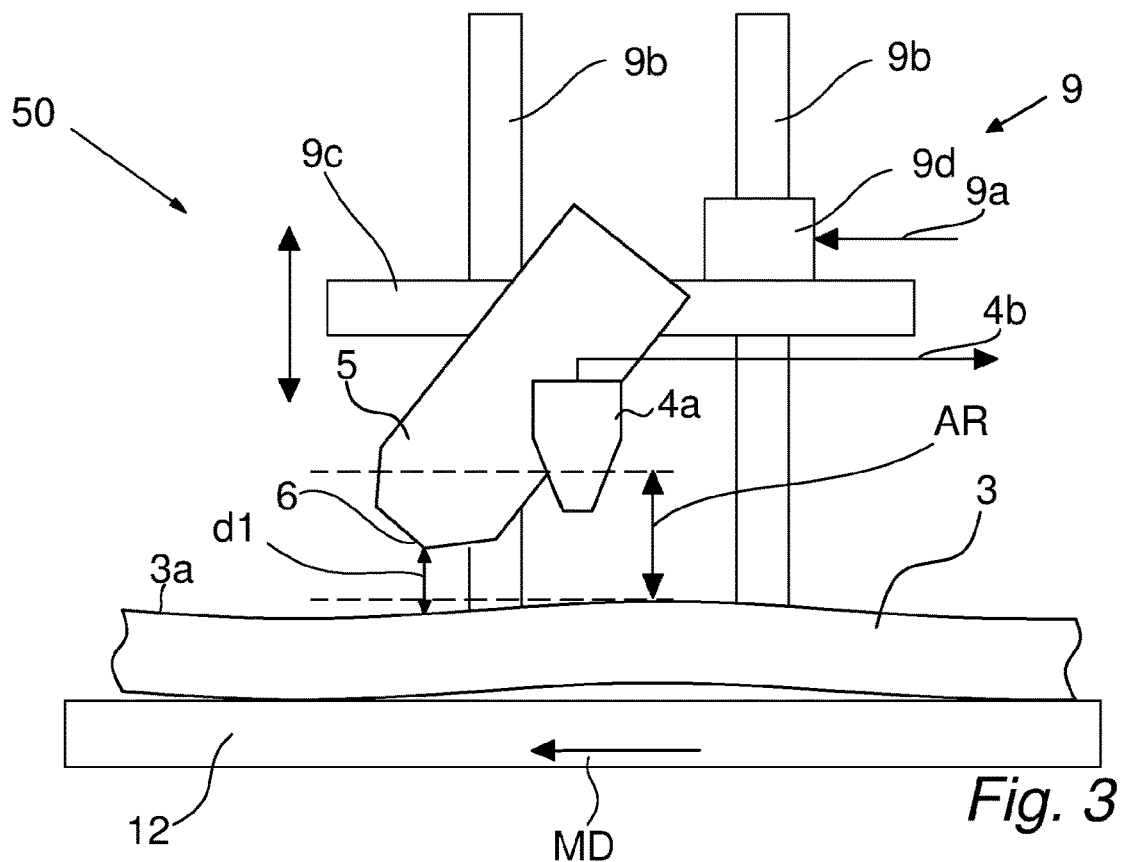
Figure 4:
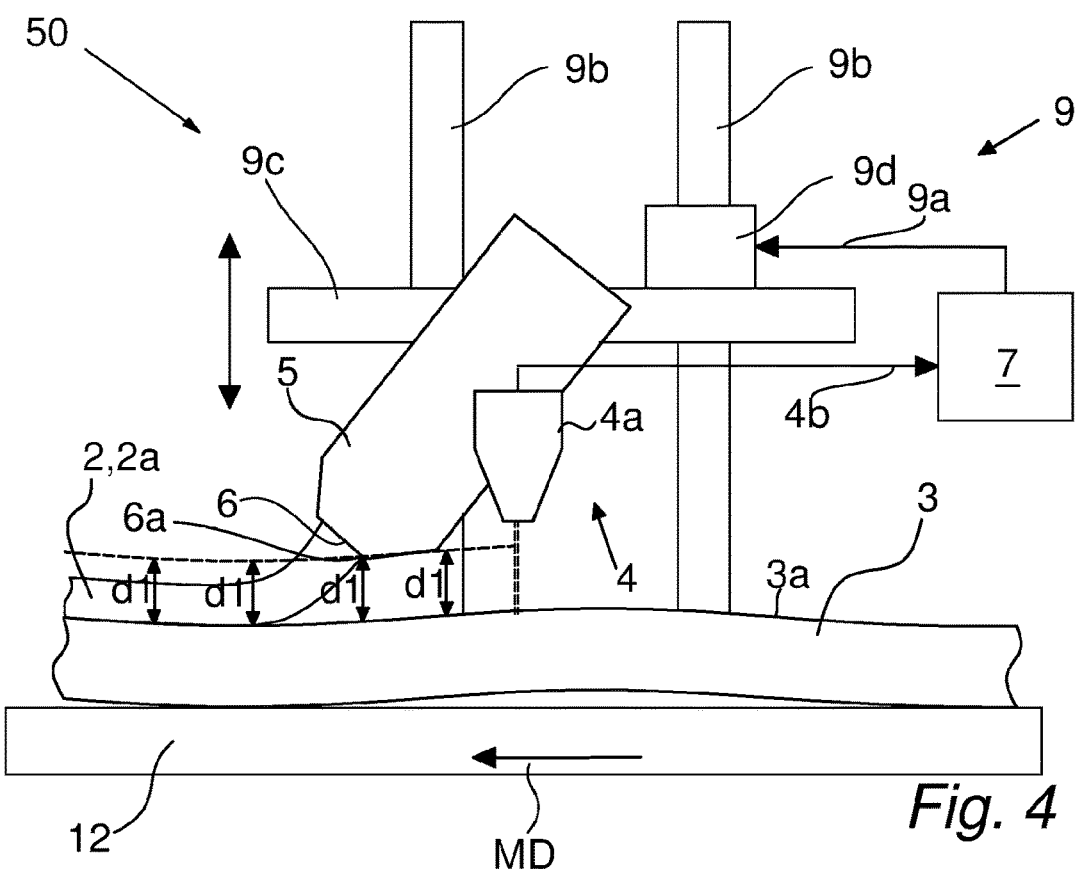
Figure 5:
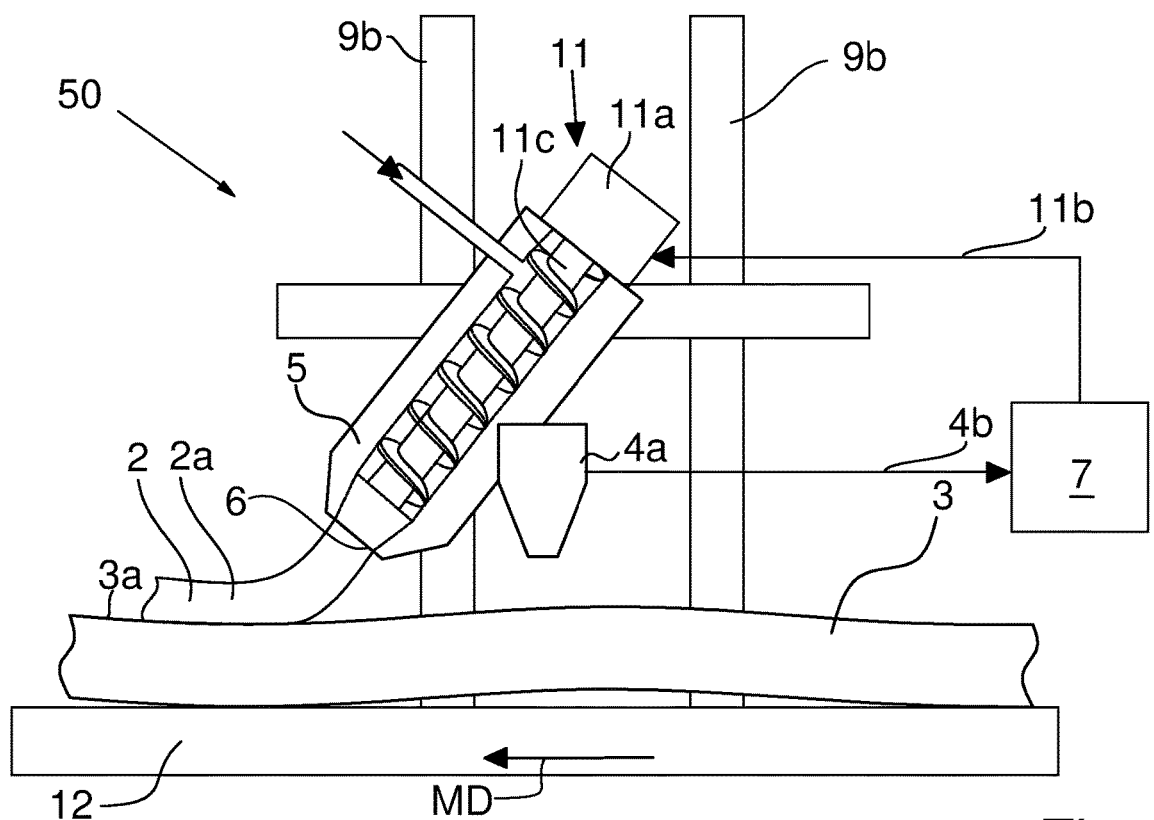
Figure 6:
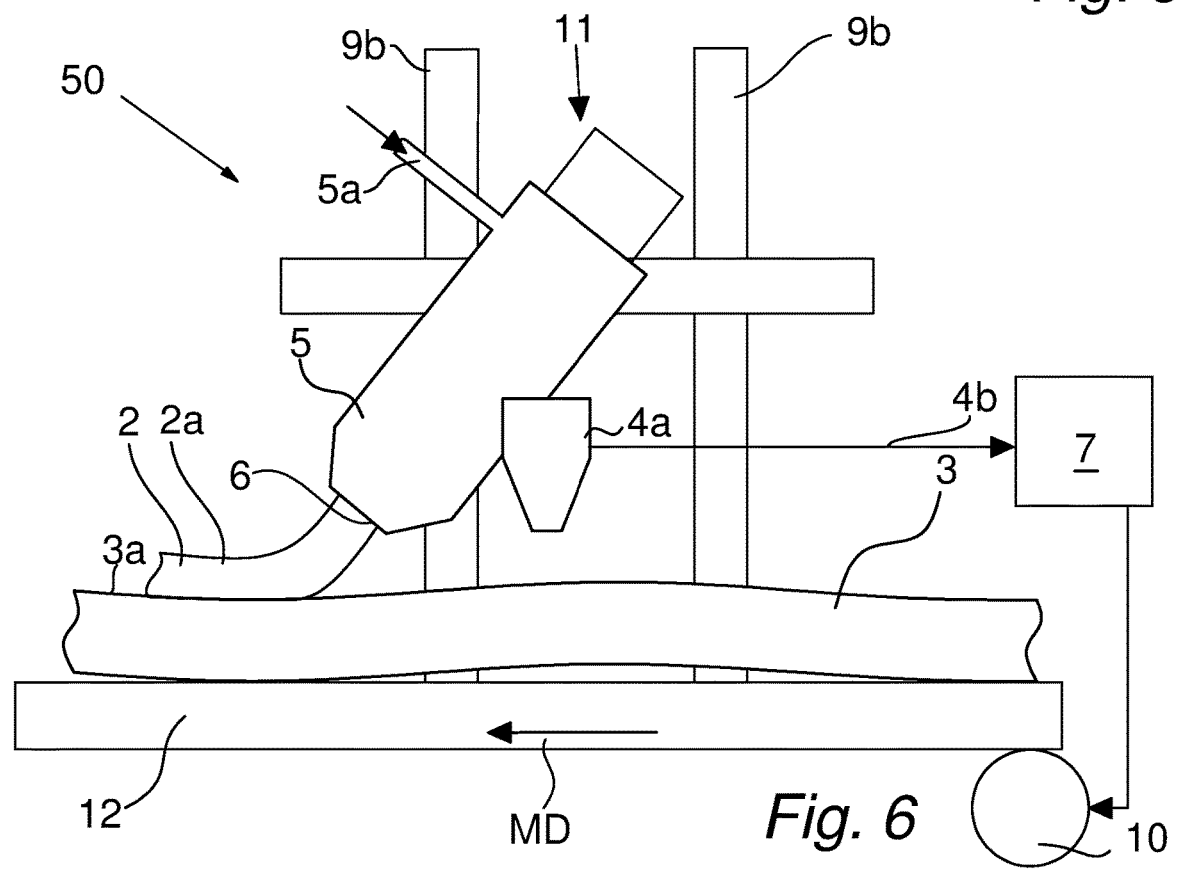
Figure 7:
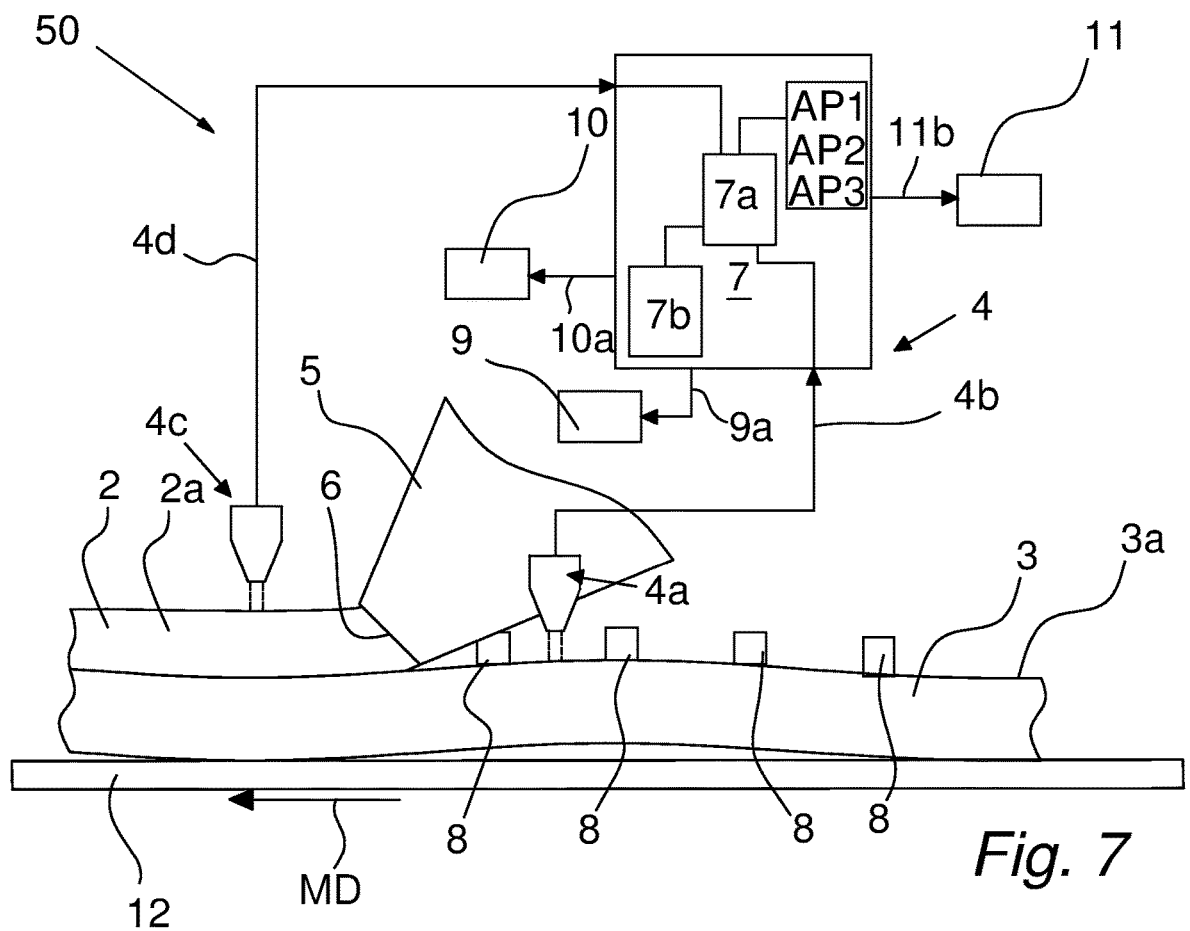
Figure 8:
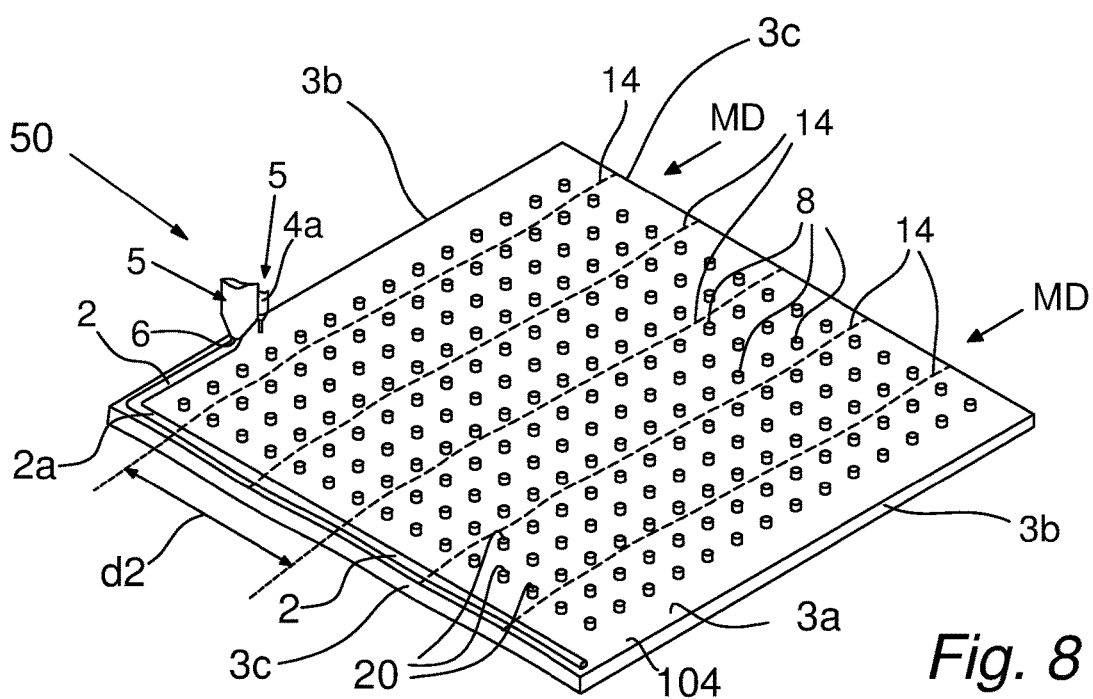
Figure 9:
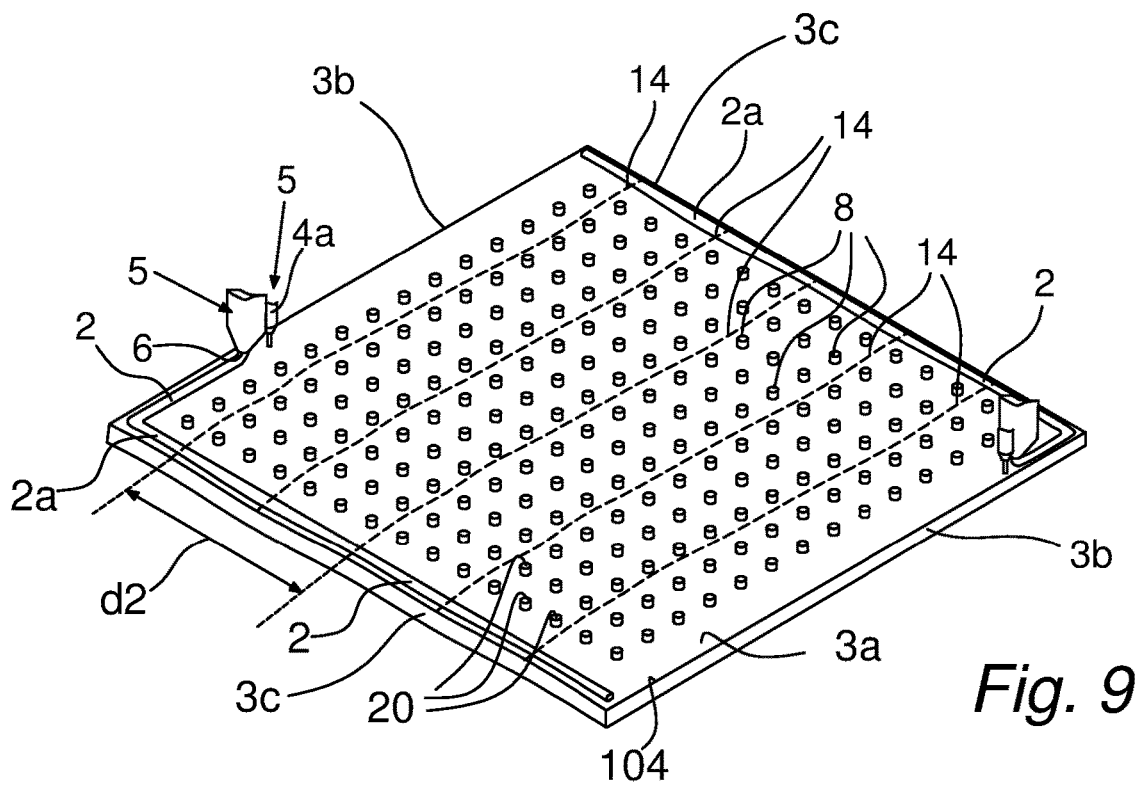
Figure 10:
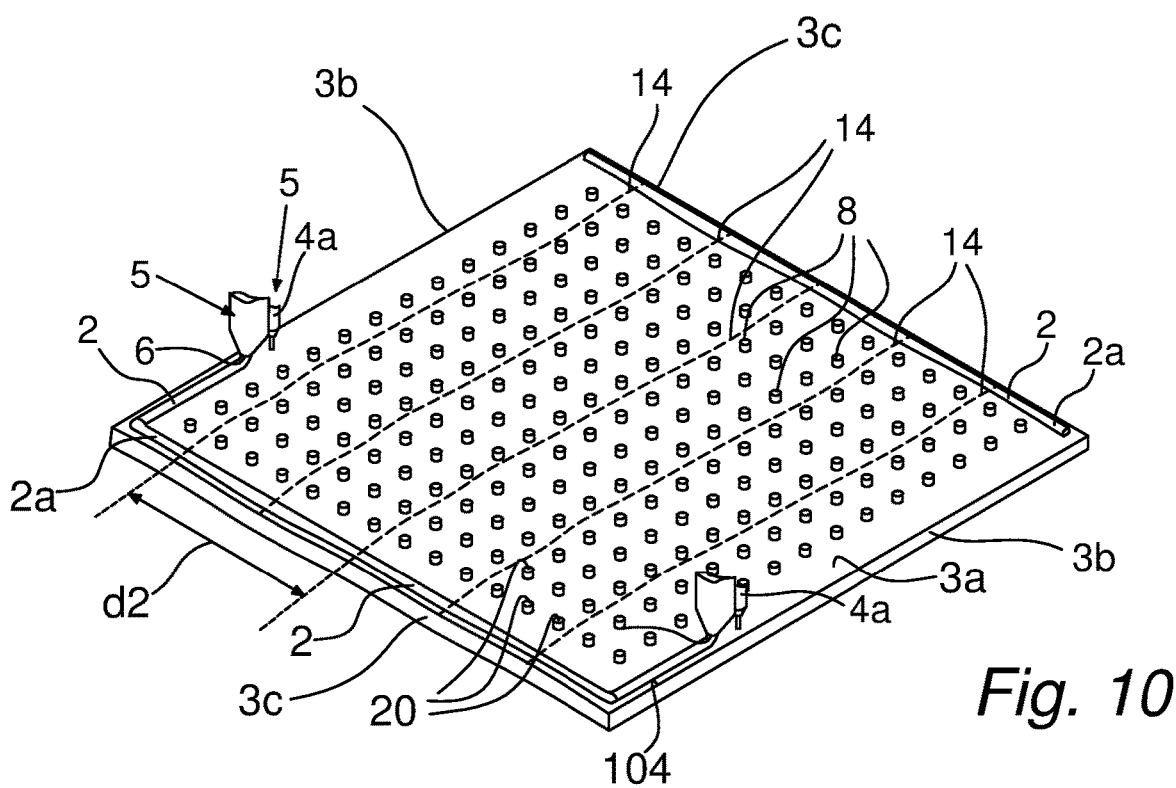
Figure 11:
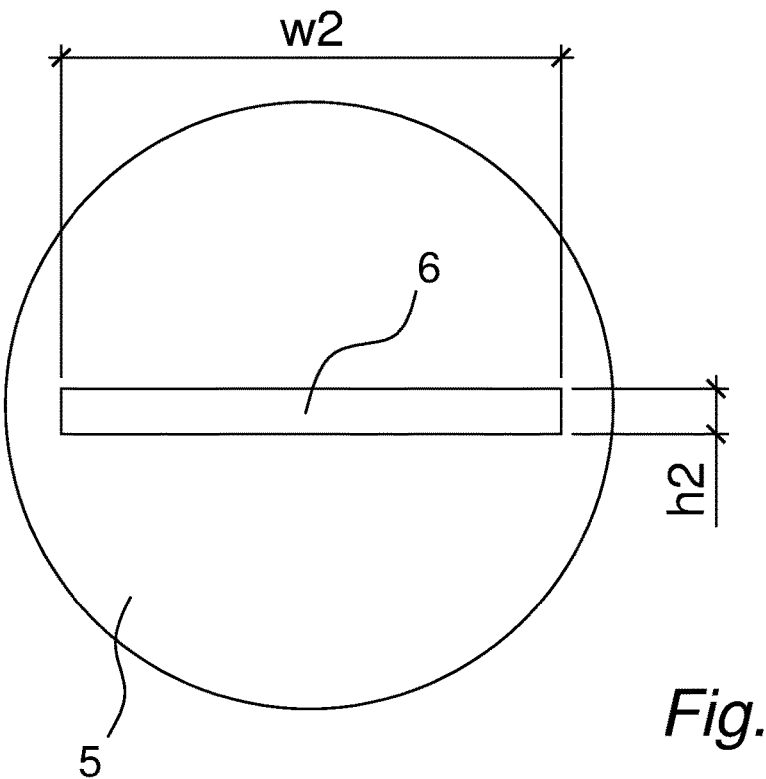
Figure 12:
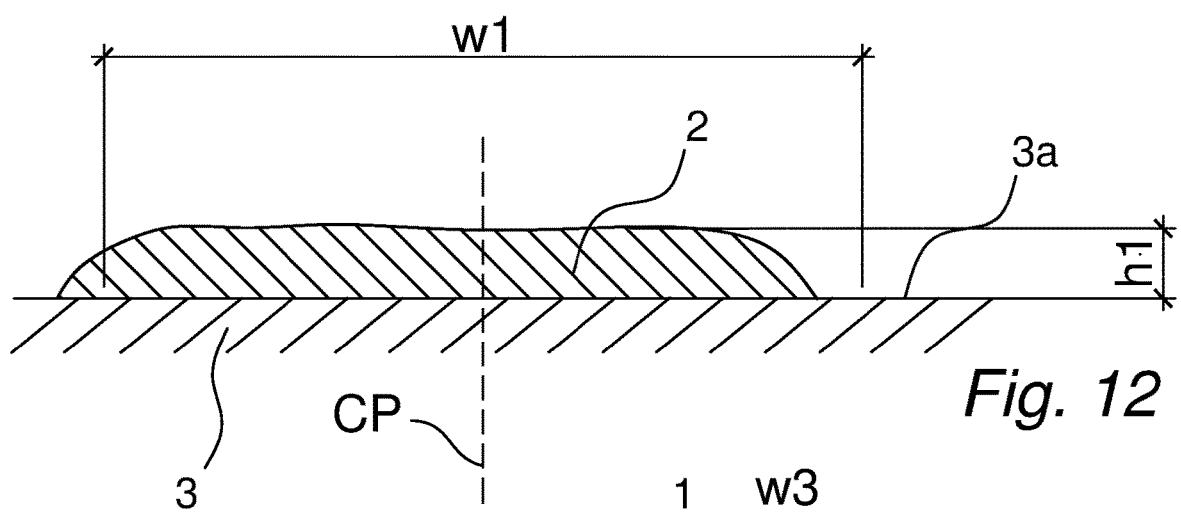
Figure 13:
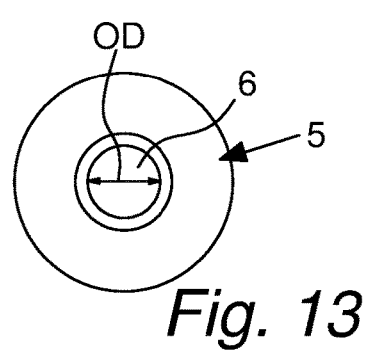
Figure 12A:
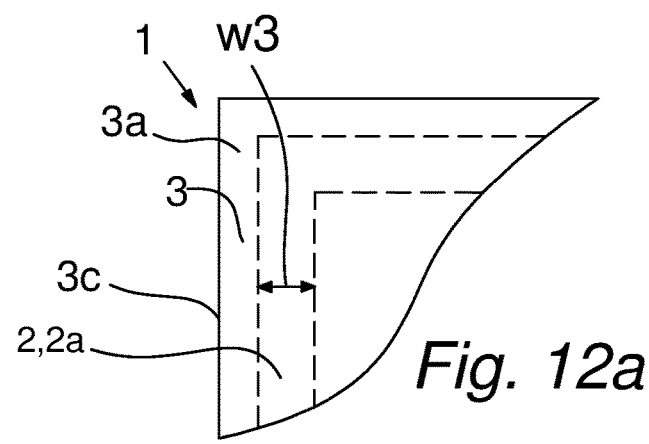
Figure 14:
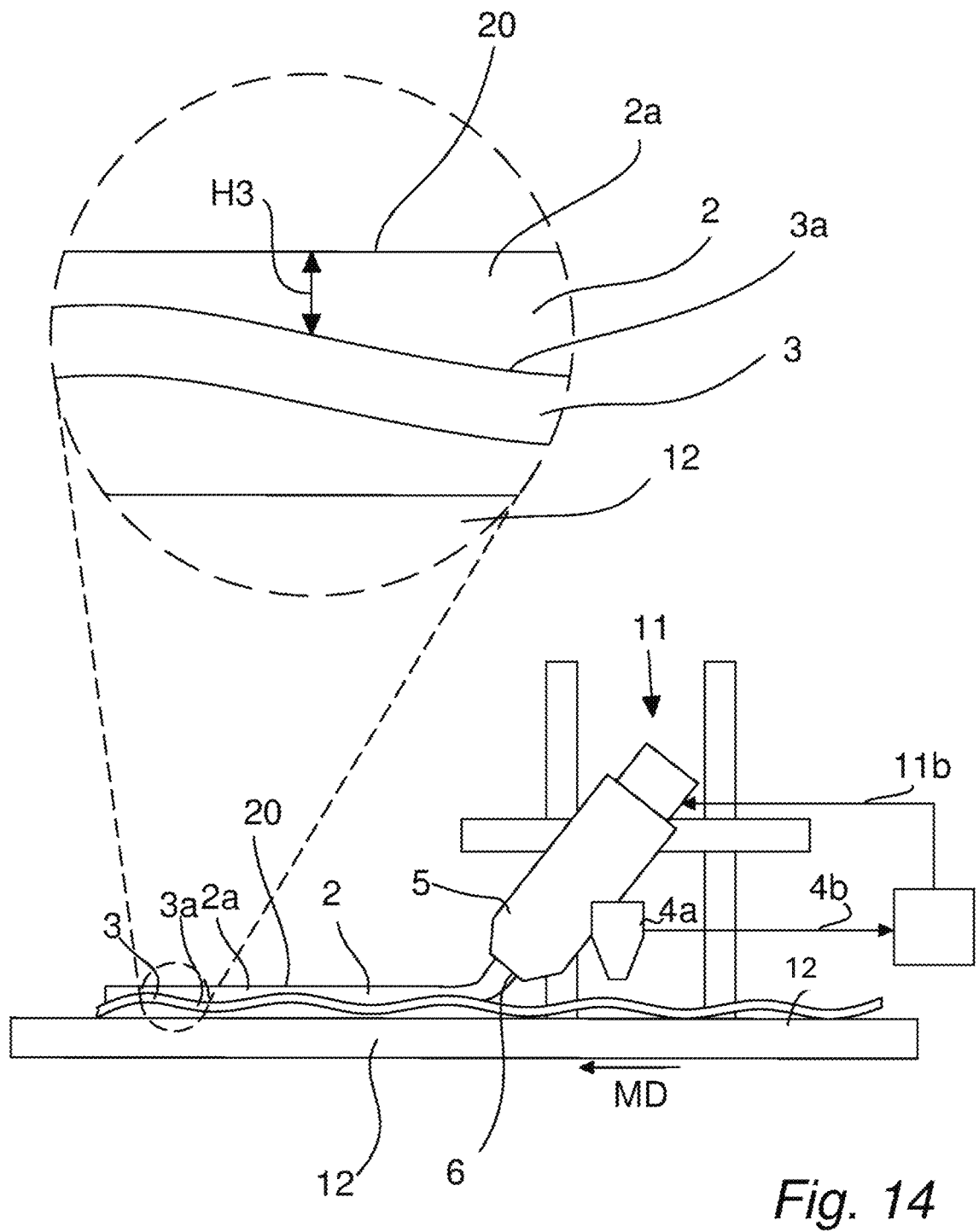
Figure 15A:
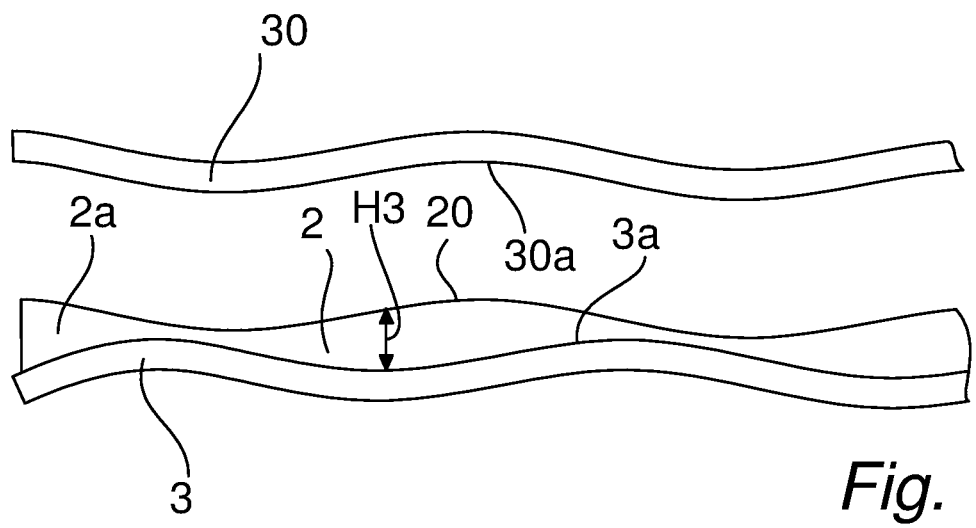
Figure 15B:
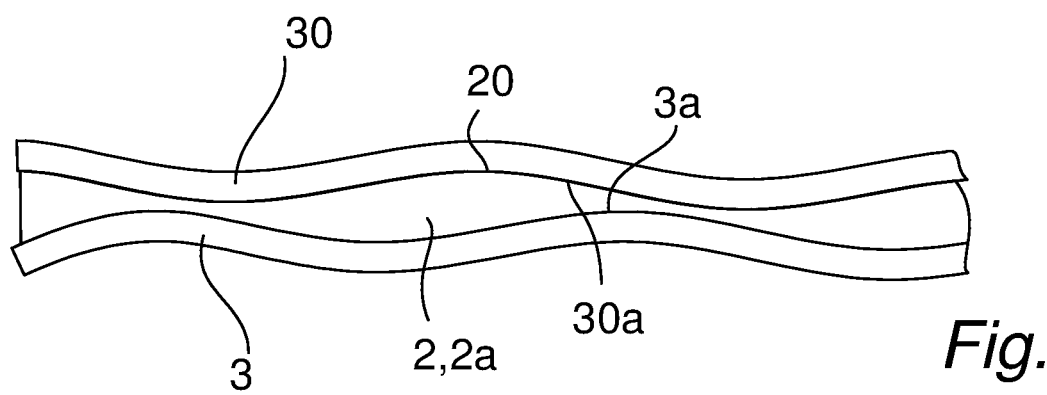
Figure 17:
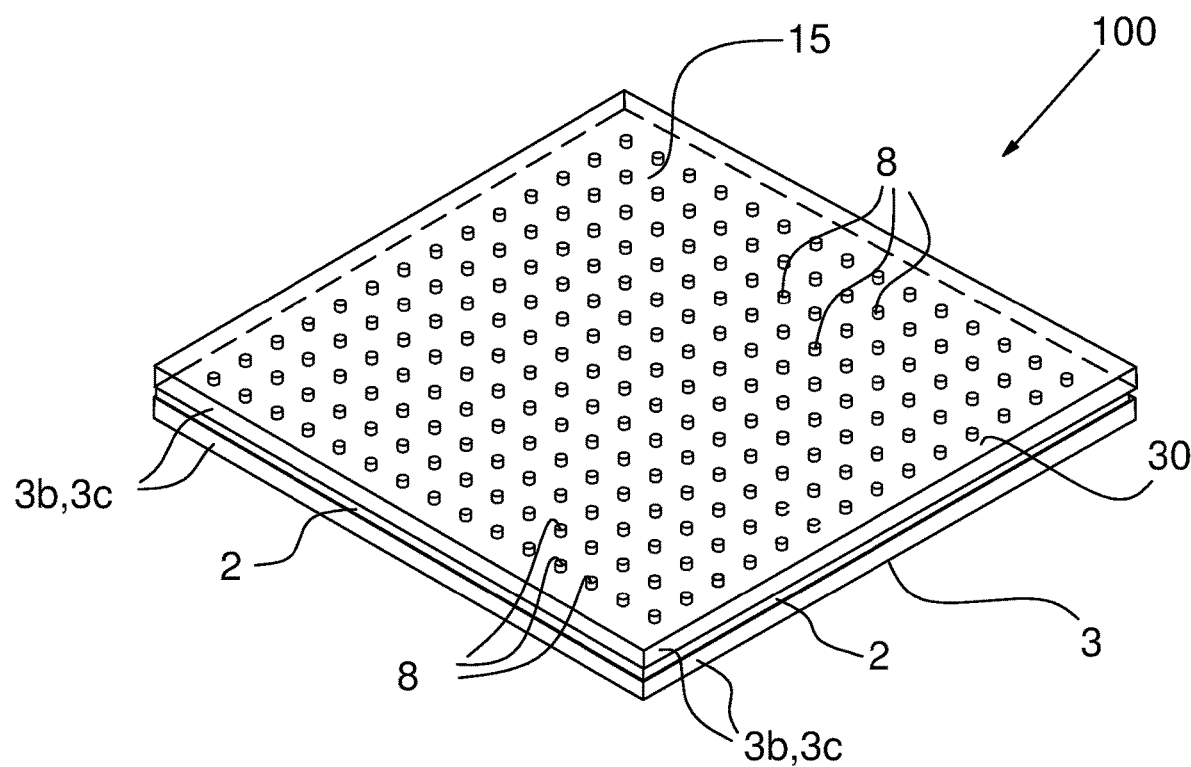

Aspects of the present disclosure will be described in the following with reference to the figures in which:

FIG. 1: illustrates a system for applying an edge seal material on a glass sheet surface according to one or more embodiments of the present disclosure, FIG. 2: illustrates a system comprising different regulation systems according to one or more embodiments of the present disclosure, FIG. 3: illustrates a regulation system configured to control a dispenser distance within an adjustment range according to one or more embodiments of the present disclosure, FIG. 4: illustrates a regulation system controlled so as to maintain a substantially constant distance, according to one or more embodiments of the present disclosure, FIG. 5: illustrates an extrusion system controlled to vary the amount of seal material provided through a nozzle outlet according to one or more embodiments of the present disclosure, FIG. 6. illustrates that a displacement speed between a glass sheet and nozzle outlet is regulated by means of an adjustment system, according to one or more embodiments of the present disclosure, FIG. 7: illustrates that one or more parameters of an applied edge sealing material is obtained by means of a sensor system, according to one or more embodiments of the present disclosure, FIG. 8: illustrates a nozzle applying edge seal material on a the surface of a tempered glass sheet having roller waves/distortion, and where an edge sealing material is applied, according to one or more embodiments of the present disclosure, FIGS. 9-10: illustrates a plurality of nozzles arranged to provide the edge seal material, according to one or more embodiments of the present disclosure, FIG. 11: illustrates a nozzle outlet opening having an elongated shape, according to one or more embodiments of the present disclosure, FIG. 12: illustrates edge seal material applied on a glass surface of a glass sheet by mans of a nozzle having an elongated opening, according to one or more embodiments of the present disclosure, FIG. 12a: illustrates edge seal material applied on a glass surface of a glass sheet according to further embodiments of the present disclosure FIG. 13: illustrates a nozzle outlet opening having a circular shape, according to one or more embodiments of the present disclosure, FIGS. 14-15b: illustrates a control system configured to control an extrusion system to control the amount of material extruded by a nozzle, according to one or more embodiments of the present disclosure, FIG. 16 illustrates embodiments of the present disclosure wherein transport lines transports glass sheets be paired/mated, and FIG. 17: illustrates a vacuum insulated glass unit provided in accordance with one or more embodiments of the present disclosure.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 discloses schematically, seen from the side, a system 50 for applying an edge seal material 2 stripe 2a on a glass sheet surface 3a of a tempered glass sheet 3 for a vacuum insulated glass VIG unit. The system 50 comprises a sensor system 4 comprising one or more distance sensors 4a, in the present example just one sensor, but two or more sensors may be used in further embodiments of the present disclosure. The sensor 4a is configured to be used for obtaining surface variation data of the major surface 3a of the tempered glass sheet 3 to be applied with the edge seal material 2.

Additionally, the system comprises a nozzle 5 configured to apply the edge seal material 2 at the major surface 3a of the tempered glass sheet through a nozzle opening 6 for dispensing the seal material.

The system comprises a control system 7 which receives a measurement input 4b based on a measurement signal from the sensor 4a of the sensor system 4.

The control system comprises a data processor 7a configured to process the measurement signal to establish surface variation data representing the surface variation of the surface 3a of the tempered glass sheet 3. The surface variations may e.g. be caused due to roller waves/distortion and/or global bending of the tempered, such as a thermally tempered, glass sheet 3.

A relative displacement is provided between the glass sheet and nozzle 5 and sensor 4a in a direction substantially parallel to/along the major surface of the glass sheet, and the sensor(s) 4a may measure/provide input 4b relating to surface variations at the part of the surface 3a where the edge sealing material will subsequently be applied by the nozzle.

In further embodiments of the present disclosure, the sensor(s) 4a may measure/provide input 4b relating to surface variations at an area that is near, such as within 10 cm, e.g. within 5 cm, e.g. within 1 cm from the surface where the seal material for the edge sealing will subsequently be applied by the nozzle. This may e.g. be sufficient to provide a reliable estimate for the surface variations without measuring directly at the specific surface part where the edge sealing material 2 is to be applied.

In the present example, the glass sheet 3 is moved in a movement direction MD relative to the sensor 4a and nozzle e.g. by moving the glass sheet 3 and keeping the nozzle in a fixed position. However, in further embodiments, the sensor 4a may be displaced while keeping the glass sheet 3 in a fixed position, and/or a combination thereof may be provided. Due to the surface variations at the tempered glass sheet 3 caused by roller waves, edge kinks, "global" deflections and/or the like, the distance between the distance sensor 4a and the glass sheet 3 changes according to the surface variation of the glass sheet. This is registered by the sensor 4a and a measurement signal 4b, e.g. an analogue signal such as a voltage or current, or a digital measurement signal is provided to the control system.

The data processor 7a processes this signal 4b according to a regulation program code stored in a data storage 7b, and based thereon one or more applying parameters AP1-AP3 configured to control the applying of the seal material by the nozzle is/are adjusted. In one or more embodiments of the present disclosure, the control system may comprise a closed loop control of the one or more applying parameters, e.g. by means of a proportional-integral-derivative (PID) controller or a proportional-derivative (PD) controller.

Accordingly, the controller may compare measured input from one or more sensors 4*a* of the sensor system, and determine one or more measured/derived errors based on one or more predefined reference values. Based on this/these errors, the control system 7 provides one or more outputs 9*a*, 10*a*, 11*b* to one or more regulation systems 9, 10, 11. The result of the regulation provided by the one or more regulation systems 9, 10, 11 due to the one or more outputs 9*a*, 10*a*, 11*b* is then measured by the one or more sensors 4*a* and provided as a feedback to the control system 7.

In further embodiments, the control system 7 may additionally or alternatively comprise one or more open loop regulation systems.

Thus, the control system 7 provides an adjustment of one or more adjustment systems 9, 10, 11 influencing on the applying of the seal material 2 by the nozzle.

The control system 7 accordingly comprises one or more data storages 7*b*, one or more data processors, such as one or more micro processors, and related control circuitry, data input and data output modules/systems and/or the like configured to provide an adjustment of the applying parameter(s) AP1-AP3.

The sensor or sensors 4*a* of the sensor system 4 may in one or more embodiments of the present disclosure comprise an electromagnetic measurement arrangement. In one or more embodiments of the present disclosure, the sensor system may comprise one or more optical sensors.

For example, the sensor(s) may comprise a focus detection arrangement arranged to measure a reflected light as a lens is moved vertically, i.e. perpendicular to the glass panes. The lens may thus be moved relative to the glass sheet until the focus point for the incident light is obtained and the movement of the lens in order to focus the light, i.e. the vertical displacement relates to the height of the surface.

The sensor 4*a* may also, in embodiments of the present disclosure, comprise of a physical measurement arrangement comprising one or more stylus devices, arranged in direct contact with the glass surface and moved across the surface such as to register any physical height variations across in order to generate a surface profile. The deflection/movement of the stylus may be registered mechanically or optically such as by reflecting of light of an area of the stylus, where the angle reflection changes as the stylus is deflected due to changes in the surface.

The sensor(s) 4*a* may in one or more embodiments of the present disclosure be based on a detection of electromagnetic waves, such as an optical measurement arrangement, measuring the variation in height across the surface based on reflected light, such as white light or laser light.

The operation of the sensor system 4 may in embodiments of the invention be based on a measure of interference between an initial transmitted wave and a reflected wave, wherein the phase shift i.e. an interference pattern created upon superposition of the waves relate to the height of the surface in relation to the wavelength used.

The measurement by the sensor system 4, may, in embodiments of the present disclosure, be based on optical detection of scattered light or specular reflected light from the surface, where the angle of reflected light is dependent on the planarity of the surface.

The measurement by the sensor system 4, may, in embodiments of the present disclosure comprise one or more optical sensors such as image sensors, for example one or more charge-coupled devices (CCD) sensors.

The above mentioned sensor types may be selected dependent on the type of measurement to be provided, e.g. a distance measurement, a height measurement, a speed measurement and/or the like.

As can be seen, support structures 8 to be arranged in the evacuated gap of the final VIG unit may be present at the major surface 3*a* of the glass sheet during the applying of the edge seal, but in further embodiments of the present disclosure, the support structures 8 may be placed later on in the VIG unit manufacturing process.

As can be seen, the glass sheet surface 3*a* varies as it is a major surface of a tempered glass sheet 3, which may have significantly larger surface variations than e.g. annealed glass sheets. The glass sheet surface 3*a* may comprise both "roller waves/distortion" which are surface variations that may e.g. have been provided by the transportation equipment used during the manufacturing of the thermally tempered glass sheet.

The one or more sensors 4*a* of the sensor system 4 and the one or more nozzles 5 may in one or more aspects of the present disclosure be kept in a substantially fixed position relative to each other, at least so that the shortest distance between the two is kept substantially un-amended when providing said adjustment of the one or more parameters.

In one or more embodiments of the present disclosure, the majority or all of the seal material 2 may be of a glassy seal material, such as a low melting point glass material, a metal solder material, and/or a metal oxide solder material. In one or more embodiments of the present disclosure, possible suitable side/edge seals 2 for the VIG unit may include materials such as low melting point solder glass frit, indium, Ostalloy 313-4, 99% indium (In) wire e.g. available from Arconium (Providence, R.I.), liquid glass (e.g., glass composition with water in it when applied, wherein the water evaporates when heated to form the inner seal portion).

In one or more embodiments, the seal material being a low melting point glass material may comprise of a portion of glass material, an organic binder, inorganic fillers, and a solvent. The seal material 2 may e.g. be a vanadium-tellurium oxide solder glass material.

In one or more embodiments of the present disclosure, said seal material 2 comprises at least one solvent material (e.g. propane-1,2-diyl diacetate) and at least one binder material (e.g. propylene carbonate $(C_4H_6O_3)n$) when applied through the nozzle opening 6. The solvents may be added in amount needed to obtain the desired viscosity of the paste. Solvents used may evaporate during the VIG unit manufacturing process e.g. around 100 degrees C., or at temperatures below this temperature.

In one or more embodiments of the present disclosure, the seal material, when applied, may be of a viscosity which is dispensable through the nozzle opening(s) 6 according to one or more embodiments of the present disclosure. The seal material 2 may be in paste or liquid form, and may comprises an self-standing characteristic in order to be able to control the dimensions of the applied seal material.

FIG. 2 illustrates schematically, seen from the side, embodiments of the present disclosure, where different regulation systems 9, 10, 11 that may be regulated by the control system 7 based on input 4*b* from the sensor system 4 are illustrated.

A first regulation system 9 is configured to controlling the dispenser distance d1 defined between the nozzle opening 6 and the glass sheet surface 3*a*. Accordingly, based on a control signal 9*a* from the control system 7. The regulation system 9 thus comprises a distance adjustment system 9 comprising one or more fixed frame parts 9b and one or more displaceable mountings 9c arranged to be displaced relative to the fixed frame part(s) 9b. The fixed frame part(s) 9b may e.g. comprise one or more rods or rail parts, a mounting configured to provide a rotational movement and/or the like. The nozzle 5 is fixed to the displaceable mounting 9c such as a bushing, a rail connector or the like. One or more displacing devices 9d, such as one or more motors, e.g. a servo motor or a stepper motor, a piezoelectric motor arrangement, a linearlinear actuator or the like is connected to the fixed frame part(s) 9b and the displaceable mounting 9c.

For example, stepper/step motor displacement configurations capable of providing a target resolution of 1 micro meter or even a larger resolution are available, which should be more than sufficient, and a lower resolution may also be suitable for controlling the dispenser distance d1.

The One or more displacing devices 9d displace the mounting(s) 9c and thus the nozzle 5 while it is guided by the fixed frame part(s) 9b, so as to control the distance between the nozzle opening 6 and the glass sheet surface 3a based on the input 9a, which has been generated by the control system 7 based on the input 4b from the sensor system 4.

Accordingly, the previously mentioned adjustment of the one or more applying parameters may provide a control of the dispenser distance defined between the nozzle opening and the glass sheet surface by means of the adjustment system for controlling the dispenser distance.

As can be seen, the sensor 4a and the nozzle may be connected to the same mounting system, and a closed loop control system may thus use the input from the sensor 4a to provide a desired adjustment of the distance between the nozzle opening and the glass sheet surface 3a by continuously measuring the distance and regulating the distance by system 9, and thus, an adjustment of the nozzle provide a simultaneous distance regulation of the sensor 4b.

In other embodiments of the present disclosure (not illustrated in any figure), a first sensor may be used for measuring a distance/surface variation, and a further "validation sensor" may be used at the nozzle to validate the measurement and help to provide a regulation of the nozzle by providing surface distance data close to the nozzle outlet.

Adjusting one or more applying parameters may also in aspects of the present disclosure provide controlling a regulation system 10 so as to control the relative displacement speed between nozzle(s) and glass sheet. By adjusting the displacement speed of the relative displacement provided in a movement direction MD between the nozzle 5 and glass sheet 3 based on sensor input 4a, this may influent on the amount of edge sealing material that is placed for the edge sealing 2 at the glass surface.

The glass sheet 3 may in one or more aspects of the present disclosure be placed on a transport system 12 such as a conveyer belt, a plurality of rollers, a flat and rigid surface, for example combined with a scratch reducing/preventing material (not illustrated) such as a cushion or fabric arranged between the glass 3 and the transport system 12. The drive arrangement 10 may be configured to operate the transport system and thus the glass sheet 3 placed on the transport system 12, so as to provide the relative displacement between the glass sheet surface 3a and the nozzle 5 and e.g. also the sensor(s) 4a, for example by means of control signals 10a from the control system 7.

As illustrated in FIG. 2, adjusting one or more applying parameters may also in aspects of the present disclosure comprise controlling the amount of seal material 2 dispensed by the nozzle outlet 6 per time unit. Accordingly, based on the sensor input 4b, the control system may vary the pressure provided by an extrusion system 11 configured to control the amount of material extruded by the nozzle 5. The extrusion system 11 may comprise a pressure arrangement or the like configured to press the seal material through the nozzle outlet 6. The pressure arrangement may comprise a gas pressure arrangement where a pressurized gas forces the seal material through the nozzle outlet 6. In embodiments of the present disclosure, the extrusion system 11 may alternatively comprise a conveyer screw configured to be rotated and dependent on the rotation speed of the conveyer screw, the amount of material applied through the nozzle per time unit may be adjusted.

In still further embodiments of the present disclosure, the extrusion system 11 may comprise a displaceable plate arranged to be displaced by a linear actuator or the like (not illustrated), and by adjusting the linear actuator displacement speed, the amount of material applied through the nozzle outlet 6 per time unit may be adjusted.

It is generally understood that in one or more aspects of the present disclosure, adjusting one or more of the applying parameters may provide an adjustment of only one, two or all three of the adjustment systems 9, 10, 11.

For example, the adjustment systems 10, and 11 may be omitted, and alone the distance d1 between the nozzle outlet and glass sheet surface may be provided by the system 9 according to embodiments of the present disclosure.

In further embodiments of the present disclosure, adjusting one or more of the applying parameters may provide an adjustment by means of the system 9 and 11, while the speed controlled by the system 10 may be kept substantially constant, and may not be adjusted based on the measurement from the sensor system to control the applying of the edge seal during the applying of the seal material 2 for the VIG unit edge seal.

In the present example, said sensor system obtains the surface variation data by the sensor 4a during the relative displacement between the sensor of the sensor system 4 and the tempered glass sheet 3 surface 3a to be applied with the seal material 2 by means of said nozzle 5.

FIG. 3 illustrates schematically, seen from the side, a regulation system 9 configured to control the dispenser distance d1 defined between the nozzle opening 6 and the glass sheet surface 3a within an adjustment range AR, and the adjustment system 9 can adjust the nozzle 5 distance d1 towards and away from the glass surface 3a in this range AR, see e.g. description above.

The displaceable mounting 9c may e.g. comprise one or more bushings, racks, toothed wheels and/or wheels (not illustrated) arranged to move and be guided along the fixed parts 9b when the displacing device(s) 9d is/are actuated by the input signal 9a, thus moving the nozzle relative to the glass sheet surface 3a, towards and away from the surface 3a within a predefined adjustment range AR.

The distance adjustment range AR may e.g. be at least 0.2 mm, such as at least 0.3 mm, e.g. at least 0.4 mm, or even larger such as at least 1 mm, e.g. at least 2 mm. In one or more aspects of the present disclosure, the adjustment range may in one or more embodiments of the present disclosure be between 0.1 mm to 20 mm, e.g. in the range of 0.1 mm to 10 mm, such as in the range of 0.15 to 2 or 5 mm so as to control the dispenser distance d1 during a relative movement between the nozzle 5 and the tempered glass sheet 3.

In one or more embodiments of the present disclosure, the adjustment system 9 for providing the dispenser distance d1 control, may be configured to provide an adjustment with an adjustment resolution within the distance adjustment range AR, which is $$\text{Adjustment resolution} = \frac{\text{adjustment range}}{\text{resolution}}$$

which is above 0.1 mm, such as above 0.05 mm, e.g. above 0.01 mm.

The adjustment resolution of the adjustment system 9 may in one or more embodiments of the present disclosure be between 0.001 mm and 0.1 mm, such as between 0.005 and 0.08 mm, e.g. between 0.01 and 0.05 mm.

For example for an adjustment resolution of 0.05 mm within the range AR provides that the minimum distance d1 adjustment the system 9 can provide is 0.05 mm, so that if the control system 7 (see above) sends a signal to the displacing device 9d to provide an adjustment, the system will at least provide a 0.05 mm adjustment, and the adjustment may e.g. be provided by a 0.05 mm increment/decrement at a time.

This adjustment resolution may e.g. be analogue or digitally controlled. For example, an Analog to Digital (A/D) converter of the control system 7 (see above) may be used, having a predefined bit resolution. For example a bit resolution between 2 bit (i.e. a resolution of 4 within the adjustment range) and 12 bit (i.e. a resolution of 4096 within the adjustment range), and including both 2 bit and/or 12 bit, e.g. between 3 bit (i.e. a resolution of 8 within the adjustment range) and 9 bit (i.e. a resolution of 512 within the adjustment range), and including both 3 bit and/or 9 bit, such as between 4 bit (i.e. a resolution of 16 within the adjustment range) and 8 bit (i.e. a resolution of 256 within the adjustment range), and including both 4 bit and/or 8 bit.

For example, an adjustment range AR of 2 mm, and having an 8 bit adjustment resolution may provide a distance adjustment resolution of $$\frac{2 \text{ mm}}{256} = \frac{1}{128} \text{ mm} \sim 0.0078 \text{ mm},$$

whereas an adjustment range of 10 mm, and having an 8 bit resolution may provide an adjustment resolution of $$\frac{10 \text{ mm}}{256} = \frac{1}{128} \text{ mm} \sim 0.039 \text{ mm}.$$

This may naturally be adapted in different ways dependent on the displacement system 9 comprising e.g. displacing device 9d in the form of a motor such as a stepper motor and e.g. also a gearing arranged to displace the nozzle.

In one or more embodiments of the present disclosure, the sensor system 4 obtains the surface variation data while the seal material 2 is applied by the nozzles 5, and thus, the sensor(s) 4a may e.g. be arranged ahead of the nozzle as illustrated in FIG. 2, or at/near the nozzle 5 outlet 6 (see FIG. 3) to detect the surface variation of the surface 3a so that the control system 7 can adjust the distance d1 and/or other applying parameters accordingly correspondingly based on the input from the sensor(s) 4a.

FIG. 4 illustrates schematically, seen from the side, embodiments of the present disclosure wherein the regulation system 9 is controlled by the control system 7 based on the sensor input from sensor 4a, so as to maintain a substantially constant, predefined distance d1 between the nozzle opening and the glass sheet surface 3a.

Accordingly, one or more applying parameters are controlled by the control system 7 during the applying of the seal material 2 and during the relative displacement between the nozzle outlet 6 and the glass sheet surface 3a, based on the surface variation data obtained by means of the sensor(s) 4a input 4b of the sensor system. Thereby, the regulation system 9 is controlled to that the nozzle outlet 6 maintains a substantially constant predefined dispenser distance d1 between the nozzle opening 6 and the glass sheet surface 3a during the relative displacement between the glass sheet 3 and nozzle 5 outlet 6.

The displacing device/displacer 9d adjusts the displacer distance d1 based on the input 9a from the control system 7, so that the nozzle/dispenser outlet 6 will follow a displacing adjustment trail/path (dashed line 13) calculated/estimated by the control system 7 based on the input 4b from the sensor system 4, and hence, the distance d1 will be kept substantially constant as the control system 7 adjusts the adjustment/regulation system 9 so that the distance d1 is adapted to the surface variations of the tempered glass sheet 3.

In one or more embodiments of the present disclosure, the distance d1 to be kept constant between the nozzle opening 6 and the glass sheet surface 3a is between 0.2 mm and 4 mm, such as between 0.5 mm and 2.5 mm, e.g. between 0.5 mm to 1.6 mm.

For example, the distance d1 may be below 3 mm, such as below 2 mm, such as below 1 mm.

The distance d1 may be measured as the shortest distance between the part 6a of the nozzle opening 6 proximate the glass sheet surface 3a, and the glass sheet surface 3a.

It is to be understood that the distance d1 between the nozzle 3 opening 6 and the glass sheet 3 surface 3a, in one or more embodiments of the present disclosure may be adjusted by the system 9 by means of a linear movement towards and away from the glass sheet surface 3a, and/or by a rotational movement (not illustrated) where the nozzle 8 provides a rotational movement, thereby amending the distance d1.

FIG. 5 illustrates schematically, seen from the side, embodiments of the present disclosure, where an extrusion system 11 is configured to vary and control the amount of seal material provided through the nozzle 5 outlet 6 based on input from the sensor system 4.

Accordingly, surface variation data is obtained based on the input from the distance variation sensor 4a, and the control system provides an output to the pressure arrangement 11a, 11b of the extrusion system 11 accordingly. In the present example, the pressure arrangement 11a, 11c comprises a conveyer screw 11c arranged to be rotated by means of a rotator device 11a such as an electric motor, e.g. a stepper/step motor, a servo motor, a motor combined with a frequency converter and/or the like. The conveyer screw's 11c rotation speed around it's longitudinal axis may thus be varied, and by varying the rotation speed of the conveyer screw, the amount of seal material applied through the nozzle per time unit may be adjusted by the control system 7 based on the surface variation data obtained by means of input from the sensor 4a.

This may in one or more further embodiments of the present disclosure be combined with varying the distance d1 (see FIGS. 3 and/or 4 and/or description thereto) based on the surface variation data obtained by means of input from the sensor 4a.

As illustrated in FIG. 5, according to one or more embodiments of the present disclosure, the nozzle 5 may be supplied with sealing material 2 to be dispensed through one or more sealing material inlets 5a to the nozzle 5 arranged at any suitable location, and the pressure system 11a, 11b of the extrusion system 11 thus controls the outflow of sealing material 2 through the nozzle outlet opening 6 and towards the surface 3a of the tempered glass sheet by controlling the dispensing pressure.

In one or more embodiments of the present disclosure, the extrusion system 11 is configured to vary the amount of applied edge seal material 2 in the range of 0.01 g/cm (gram/centimetre) to 0.2 g/cm edge seal 2, such as between 0.02 g/cm to 0.12 g/cm, e.g. between 0.02 to 0.07 g/cm edge seal and/or e.g. between 0.04 to 0.10 g/cm edge seal 2. This may be varied by controlling the rotation speed of the conveyer screw by the input signal 11b, by varying a dispensing pressure applied by means of a pressurized gas (not illustrated) and/or the like.

Accordingly, by increasing the amount of applied edge seal per centimetre edge seal 2, this may cause an increased height and/or width of edge seal 2 at desired locations, determined based on the surface variation data obtained by means of the sensor input 4b from the sensor or sensors 4a.

FIG. 6 illustrates schematically, see from the side, one or more embodiments of the present disclosure wherein an adjustment by a control system 7 of one or more applying parameters provide a control of the relative displacement speed between the glass sheet and nozzle outlet 6 by means of an adjustment system 10. As mentioned previously, by adjusting the displacement speed of the relative displacement provided in a movement direction MD between the nozzle 5 and glass sheet 3 while the sealing material 2 is applied, based on sensor input 4a, this may influent on the amount of edge sealing material that is placed for the edge sealing 2 at the glass: surface.

For example, a higher, relative displacement speed may help to reduce the height of the edge seal material applied/deposited at the surface 3a, and a slower speed may increase the height of the seal material applied/deposited at the surface 3a. This adjustment may be provided by regulating one or more drive arrangements 10 such as electric motors, e.g. step/stepper motors, a motor/frequency converter system and/or the like configured to provide the relative displacement between the nozzle(s) 5 and glass sheet.

FIG. 7 illustrates schematically an embodiment of the present disclosure where a sensor arrangement 4c, such as a single or a plurality of sensors of the sensor system 4 provides a measurement of one or more parameters of the applied edge sealing material. These measurement parameters may e.g. be the width of the applied edge sealing material 2 and/or the height of the applied edge sealing material 2 at the surface 3a. This measurement is provided as an input 4d to the control system 7 to provide a control of the one or more applying parameters AP1-AP3 based thereon.

In FIG. 7, both the measurement by the sensor 4a to obtain the surface variation data of the glass sheet surface 3a, and a measurement by the sensor arrangement 4c to obtain one or more parameters of the applied edge sealing material 2 is provided and used at input 4b, 4d, e.g. in a closed loop system as parameters to calculate an error against one or more predefined reference points, and based thereon transmit control signals to the one or more adjustment systems 9, 10, 11, e.g. as previously described.

The sensor arrangement 4c of the sensor system may in one or more embodiments of the present disclosure comprise one or more sensors such as electromagnetic sensor(s), e.g. optical sensor(s), one or more image sensors and/or the like, e.g. as described in relation to FIG. 1.

FIG. 8 illustrates schematically, in perspective, a nozzle 5 applying the edge seal material 2 on the surface 3a of the tempered glass sheet 3. A plurality of support structures 8 are distributed in the major surface 3a. The glass sheet 3 is moved in the movement direction MD (however, no transportation system is illustrated in the figure), to provide a relative displacement between the glass sheet surface 3a and nozzle 5 outlet 6 during applying of the edge seal 2.

The dashed lines 14 illustrates an example of periodic roller wave peaks and valleys/troughs 14 of the tempered glass sheet. These may be arranged with a substantially similar mutual peak to peak distance d2 (as illustrated) or valleys/trough to valleys/trough, which was determined by the production equipment used during manufacturing of the tempered glass sheet 3 prior to the applying of the edge seal 2.

As can be seen, the roller waves may extend substantially parallel to first end edge surfaces 3b, and may extend substantially perpendicularly to and between second end edge surfaces 3c. The first end edge surface 3b extend substantially perpendicular to the second end edge surfaces 3c, thus providing a rectangular shaped glass sheet 3.

Due to the roller waves/distortion 14, the edge seal 2 may be provided individually and differently dependent on whether the edge seal 2 is to extend on the surface 3a in a direction transverse to the roller waves 14 along and near the edges 3c extending transverse to the roller waves, or whether the edge seal 2 is to extend on the surface 3a in a direction substantially parallel to the roller waves 14 along and near the edges 3b extending parallel to the roller waves 14. The one or more applying parameters may thus be controlled based on the input from the sensor system 4 comprising sensor 4a as e.g. previously described, and hereby automatically adjust the applying of the edge seal 2 to whether the edge seal 2 is applied along and near the edges 3c or along and near the edges 3b.

FIGS. 9-10 illustrates schematically and in perspective a thermally tempered glass sheet comprising the roller waves/distortions 14, where a plurality of nozzles 5 are arranged to provide the edge seal material 2. In FIG. 9, the nozzles are moved while the glass sheet 3 is kept fixed. In FIG. 10, the nozzles may be kept fixed while the relative displacement between the glass sheet 3 and nozzle 5 during applying of the edge seal material 2 is provided by moving the nozzle. Here, the glass sheet 3 may have been rotated, e.g. in a horizontal plane, after first strips of edge seal 2 has been applied, e.g. by nozzles not illustrated, and the nozzles 5 illustrated may then provide substantially parallel edge seal material strips near the edge surfaces 3b.

For both FIGS. 9 and 10, the sensors 4a of the sensor system may be arranged to provide input to a control system as e.g. explained above, in order to control one or more adjustment systems (see references 9, 10, 11 in relation to description above) influencing on the applying of said seal material by the nozzles, to that the input from the sensors 4a provides an individual adjustment of one or more of these systems dependent on the surface variation data obtained by the respective sensor 4a.

As can be seen on FIG. 8 and e.g. also FIGS. 9 and 10, the nozzle or nozzles 5 may provide substantially continuous strips 2a of edge sealing material along/parallel to an edge surface 3c, 3b of the glass sheet, and this is done during the relative displacement between the glass sheet 3 and the nozzle. The nozzle(s) may also apply the edge seal 2 (as illustrated in e.g. FIGS. 8 and 9) at the corners of the glass sheet during a movement to e.g. rotate the glass sheet 3 and/or by amending the movement direction of the nozzle(s), or the nozzle(s) 5 may be configured to provide straight stripes 2a of edge seal 2, and these may be connected near the corners of the glass sheet 3, see e.g. FIG. 10.

FIG. 11 illustrates schematically a front view of a nozzle 5 having a nozzle opening 6 and configured to apply a seal material 2 at the major surface 3a of the glass sheet 3 through the nozzle opening 6 for dispensing the seal material 2. The nozzle 5 is viewed along a direction perpendicular to the extent of the nozzle opening 6. The nozzle opening 6 is of elongated shape being substantially a rectangular cross-sectional shape of a width w2 measured along the longest extent of the opening and a height h2 measured along the shortest extend of the opening. In one or more embodiments of the present disclosure, a tip part of the nozzle 5 may be a separate element to the remainder of the nozzle and may be configured to be arranged onto conventional nozzle tips having round nozzle openings, so as to convert the nozzle into having an elongated nozzle opening. The attachment of the front tip part may be aided by any suitable fastening means such as by a screw-connection, clamp, glue etc. In other embodiments of the present disclosure, the tip part having the elongated shape may be an integrated part of the rest of the nozzle 2.

Generally, In one or more embodiments of the present disclosure, at least the parts of the nozzle 5 in contact with the seal material 2, such as the interior of the nozzle, a nozzle tip part or the entire nozzle and/or the like may be made of metal, such as steel or it may be made of a plastic material, such as polyethylene or acetyl. For applications of a paste of low melting point glass material containing solvent, the nozzle is preferably made of metal.

In one or more embodiments of the present disclosure, the side/edge seal material 2 may be a premade/premixed low melting point glass material dispensed using a polyethylene or metal nozzle having a nozzle opening of a width of 8 mm and a nozzle opening height of 0.25 mm.

The material 2 may in one or more embodiments of the present disclosure be dispensed using a pressure of e.g. 5-20 Psi, controlled by an adjustment system for controlling the amount of seal material dispensed by the nozzle outlet per time unit (see e.g. previous description relating to adjustment system 11).

The major axis of the nozzle opening 6 may e.g. be kept substantially parallel to the glass sheet surface 3a.

The nozzle opening 6 may in embodiments of the present disclosure be of an aspect ratio of width (w2) to height (h2), i.e. w2:h2 between 16:1-48:1, such as between 24:1-40:1.

In one or more embodiments of the present disclosure, the width w2 of the nozzle opening may be between 5-15 mm, such as between 6-12 mm, such as between 7-9 mm, measured along the major axis of the nozzle opening 6. In one or more embodiments of the present disclosure, the height h2 of the nozzle opening 6, measured along the minor axis of the nozzle opening, may be between 0.1-0.1.5 mm, or such as between 0.1-0.6 mm or such as between 0.2-0.4 mm.

FIG. 12 illustrates a cross-sectional view of a seal material 2 applied on a glass surface 3a of a glass sheet 3 by means of a nozzle having an elongated outlet 6, e.g. as described above. Due to the elongated nozzle opening 6, the applied seal material 2 is of an elongated shape, having a width w1 measured along the glass surface 3a and a height h1 measured along a direction perpendicular to glass surface 3a. The seal material 2 is preferably of a viscosity making it extrudable through the nozzle opening 6 and in the present example, the seal material 6 is of a viscosity similar to a paste-like consistency, resulting in the shown cross-sectional shape.

The height h1 may vary at each side of the applied seal material, and is significantly more constant between the sides thereof. In one or more examples the present seal material is a premade low melting point glass material in paste-form containing binder and solvent.

The seal material 2 applied is of an elongated cross-sectional shape, such as a rectangular or oval cross-sectional shape. In one or more embodiments of the present disclosure, the cross-sectional shape of the applied seal material 2 may be of an aspect ratio, being the ratio of width w1 to height h1, between (5:1)-(20:1), such as between (8:1)-(16:1).

In one or more embodiments of the present disclosure, the applied seal material width w1 is between 3-12 mm, such as between 4-10 mm, such as between 5-9 mm such as between 6-8 mm measured along the surface 3a of the glass sheet on which the seal material is deposited.

In one or more embodiments of the present disclosure, the transverse cross-sectional shape of the applied seal material 2 may be of a height h1 between 0.3-0.6 mm such as between 0.4-0.6 mm. Here, in further embodiments of the present disclosure, the transverse cross-sectional shape of the applied seal material may be of an aspect ratio, being the ratio of width (w1) to height (h1), which is between (5:1)-(30:1), or such as between (8:1)-(24:1) or such as between (10:1)-(20:1).

FIG. 12a illustrates schematically the edge sealing strip 2a seen from above of a finished VIG unit 1 according to one or more embodiments of the present disclosure. The seal material width w3 after the VIG unit 1 has been manufactured and the gap between the glass sheets 3, 30 (30 not presented in FIG. 12a as the view is onto the outer major surface of the glass sheet 3) providing the VIG unit has thus been evacuated and sealed, is between 4-12 mm, such as between 5-9 mm, such as between 6-8 mm measured along the surface 3a of the glass sheet on which the seal material is deposited.

The width w1 (FIG. 12) and w3 (FIG. 12a) may as illustrated be measured in a direction: substantially perpendicular to the direction in which the edge sealing stripe 2a extend along the end edge surface 3c.

In one or more embodiments of the present disclosure, the deposited seal material height h1 is between 0.3-0.6 mm, or such as between 0.3-0.5 mm, e.g. between 0.3-0.4 mm, measured perpendicular to the major surface 3a of the glass sheet 3 on which the seal material is applied.

In one or more embodiments, the seal material height h1 is approximately 2.0-2.5 times the average distance between the interior surfaces of the glass sheets, i.e. the gap size.

In one or more embodiments, the average seal material height (h1) varies by less than 30%, or such as by less than 25% along ¾ of the seal material width, where the 3/4 part of the width is centred around the centre point CP half way through the total width w1 of the seal material.

It is generally understood that in one or more aspects of the present disclosure, see e.g. FIG. 13, the nozzle outlet 6 shape may also be substantially circular, quadratic, and/or the like. This may affect the shape of the applied edge seal material 2, such as the height h1 of the edge seal material. The height of the applied edge seal material 2, applied by means of a nozzle outlet shape that is circular, quadratic, and/or the like may e.g. be between 0.3-0.8 mm, such as between 0.3-0.6 mm, or such as between 0.3-0.5 mm such as around 0.3-0.4 mm. The circular outlet 6 may e.g. have an outlet diameter between 0.2-0.9 mm, such as between 0.3-0.6 mm, or such as between 0.3-0.5 mm, for example around 0.3-0.4 mm.

In one or more embodiments of the present disclosure, the nozzle outlet diameter OD or height h2 may be larger than the height h1 of the applied seal material 2.

It is generally understood, that the control provided by a control system 7 as e.g. described in relation to one or more of the FIGS. 1-10 in embodiments of the present disclosure may provide that the height h1 of the edge seal may intentionally vary over the surface of the glass sheet 3a, e.g. in order to adapt the height h1 to the roller wave/distortion, global bends and/or kinks of the glass sheet based on the surface variation data obtained by means of a sensor system 4. In other embodiments, the height h1 may be adapted to be substantially constant.

FIG. 14 illustrates schematically in perspective an embodiment of the present disclosure wherein an the control system 7 is configured to control the extrusion system 11 to control the amount of material extruded by the nozzle 5 based on the sensor input 4b so as to obtain a substantially straight top surface 20 of the sealing stripe 2a applied by the nozzle 5, or a top surface 20 varying less than the surface variation of the glass sheet surface 3a.

The sensor 4a determines the surface variation of the glass sheet 3 as e.g. previously described, e.g. by means of a distance measurement during a relative movement between the glass sheet 3 and the nozzle 5 outlet 6 as illustrated, or alternatively during a previous measurement where the measurement information of the surface variation information may be stored in a data storage for later use during the applying of the sealing material 2 when the glass sheet is subsequently placed at a manufacturing station/system where the edge sealing material 2 is applied.

The extrusion system 11 thus adjust the amount of sealing material applied, e.g. so that more edge sealing material is applied at valleys/troughs that at the peaks of the tempered glass sheet 3 by adjusting the amount of sealing material dispensed through the nozzle 5 outlet 6 per time unit. Alternatively, or additionally, the amount of material 2 may in embodiments of the present disclosure be adjusted by adjusting the displacement speed of the relative displacement provided in a movement direction MD between the nozzle 5 and glass sheet 3 based on sensor input 4a, so as to influent on the amount of edge sealing material that is placed for the edge sealing 2 at the glass surface 3b.

This may in one or more embodiments of the present disclosure be provided for two glass sheets to be paired/mated for the final VIG units, so that both these glass sheets are provided with an edge sealing having a substantially straight top surface, or at least a top surface 20 which is more straight than the surface variations of the glass sheet surface 3a at the area for the edge sealing stripes 2a. Subsequently, when these glass sheets are then paired/mated, the top surfaces 20 of the edge sealing stripes 2a may thus fit better each other substantially irrespectively of the surface variations such as roller wave variations and/or edge kink surface variations of the glass sheets.

FIGS. 15a-15b illustrates schematically a further embodiment of the present disclosure where the amount of edge sealing material applied for the edge sealing stripe 2a varies over the surface 3a, based on sensor input (not illustrated) as e.g. illustrated above and/or below.

Here, the variation of the top surface 20 of the edge sealing stripe 2a is adapted to the surface variation of the glass sheet 30 surface 30a to face the edge sealing material stripe 2a to provide the edge sealing between the glass sheets 30, 3.

Thus, a sensor arrangement 4a as e.g. previously explained, prior to applying the edge sealing material 2a may detect surface variations of the surface 30a of the glass sheet to be paired with the glass sheet 3. The same may be applied for the surface 3a, either during the applying of the edge sealing material, or prior to applying the edge sealing material 2.

Based on this information, the extrusion system 11, and/or a displacement system 10 (not illustrated in FIGS. 15a-15b), see e.g. above, may be configured to control the amount of material extruded by the nozzle 5 per time unit based on the sensor information received and/or stored, and/or adjust a displacement speed between the glass sheet based on sensor information received and/or stored, so as to obtain a varying thickness/height of the edge sealing material that may be designed to match at least partly, the surface variations of the surface 30a.

Accordingly, when the tempered glass sheets 3, 30 are paired so that the surfaces 3a, 30a faces each other to provide a VIG unit (see FIG. 15b), the edge sealing material 2a height fit the surface variations of the surfaces 30a, 3a caused by e.g. roller wave variations and/or edge kink surface variations providing a gap distance that may vary along the extent of the glass sheets 3, 30.

The surface variation of the top surface 20 of the edge sealing stripe 2a may even intentionally, at least at some areas of the edge sealing 2a vary more than the surface variation of the glass sheet surface 3a at which the edge sealing stripe is applied, In order to accommodate the surface variations of the surface 30a of the tempered glass sheet 30 to be mated/paired with the first glass sheet 3.

In both FIGS. 14 and 15a-15b, the height H3 of the edge sealing material is controlled by the control system 7 to vary over the surface 3a based on surface variation data obtained from one or more glass sheets 3, 30 by a sensor system or systems.

It is generally understood that the present disclosure, e.g. as described in relation to one or more of the above FIGS. 1-7 and/or 11-15b in one or more embodiments of the present disclosure, may help to provide a solution where the variation in seal width w3 (see FIG. 12a) in the final VIG unit (see FIG. 17 and/or description thereto) is maintained low within a selected seal portion of the edge seal 2. The seal portion is defined along a length of e.g. at least 10 cm, such as a seal portion length between 10 cm and 15 cm, but the seal portion length may also be substantially the entire length of the edge seal extending along a glass sheet end edge surface 3b, 3c or even along a plurality of edge surfaces 3b, 3c. The seal portion is determined/measured along the neighbouring edges/edge surface 3a, 3b of the glass sheet. The variation in seal width in this seal portion at the final VIG unit may here be less than 40%, such as less than 20%, e.g. less than 10% such as less than 8%. In one or more embodiments of the present disclosure, the variation in the seal width in the final VIG unit may be obtained to be below 2.4 mm, such as below 1.8 mm, such as below 1.4 mm, e.g. as below 1.0 mm, such as below 0.8 mm. In one or more embodiments, the variation in the seal width may be between 0.3-2.4 mm, such as between 0.5-1.8 mm, such as between 1-2 mm within said seal portion.

FIG. 16 illustrates embodiments of the present disclosure, wherein parallel transport lines 12 transports glass sheets 3, 30 to be paired/mated. Surface variations are determined at each their glass sheets 3, 30 to be mated by sensor systems 4. The information from the sensor systems 4 is processed by the control system 7, and based thereon, the edge sealing 2 may be applied by one or more nozzles at an applying station 41 while the control system 7 controls one or more adjustment systems 9, 10, 11 (not illustrated in FIG. 16, see e.g. above) influencing on the applying of the seal material 2 based on the information obtained by the sensor systems 4. This may be done at first glass sheets 3, e.g. while other glass sheets 30 are processed otherwise. For example at a support structure placement station 42 to be provided with support structures (e.g. by means of a vision sensor and a robotic arm or the like configured to place the support structures) for maintaining the gap in the final VIG unit. Alternatively, the glass sheets 30 may just await the applying of the glass sheet material at the glass sheet 30.

After this, the glass sheets 3, 30 are mated/paired at a pairing station 43 comprising an arrangement for pairing/mating the glass sheets. This pairing arrangement may e.g. comprise one or more robotic arms, one or more linear actuators such as pneumatically, hydraulically and/or electrically controlled actuators, and/or the like. The pairing arrangement may e.g. comprise a suction cup system, one or more clamps, claws and/or the like configured to hold, place (and e.g. also align) one glass sheet 3 on top of the other glass sheet 30, and then let go of the glass sheet(s) to be ready for the next arrangement of glass sheets. The pairing arrangement of the pairing station 43 can thus at least move the glass sheets to be mated/paired towards each other when the glass sheets have been properly aligned so that the glass sheets are placed in parallel with interior major surfaces 3a, 30a of the glass sheets 3, 30 facing each other and providing a gap therein between.

The control system 7 may in one or more embodiments of the present disclosure receive and/or store (in a data storage) glass sheet identifications such as a QR code, barcode, RFID information, an ID number obtained by image identification and/or the like obtained from the glass sheets 3, 30. This glass sheet identification is associated with surface variation data related to/obtained from the respective glass sheet. Accordingly a scanner solution or the like may thus later on obtain glass sheet identification at or near the applying station 41 prior to applying the edge sealing material 2, and the control system 7 may thus control one or more adjustment systems 9, 10, 11 according to the surface variation data associated with the respective glass sheet identification. It is naturally understood that this may e.g. be omitted, at least partly, if the surface information is obtained during the applying of the sealing material 2, e.g., and e.g. if the surface variation of the glass material to be mated/paired with the glass sheet 3 comprising the applied edge sealing 2 is not used by the control system as explained previously.

In further embodiments of the present disclosure (not illustrated in FIG. 16), a sensor system 4 may alone determine surface variations at the surfaces 3a to be applied with the edge sealing material, and the control system 7 may thus adjust one or more adjustment systems 9, 10, 11 (not illustrated in FIG. 16, see e.g. above) influencing on the applying of the seal material 2 by one or more nozzles at the station 41 without taking surface variation information from the glass sheets 30 to be paired with the glass sheet applied with the edge sealing material, into consideration.

FIG. 17 illustrates schematically in perspective a VIG unit 100 made according to one or more of the embodiments described above and/or below. The VIG unit comprises the glass sheets 3, 30, and an edge sealing 2 made from e.g. a glass material and/or the like as previously described.

A plurality of support structures 8 are arranged in the gap 15 between the tempered glass sheets 3, 30, and the gap 15 is evacuated to a pressure below $10^{-3}$ bar, for example below $10^{-4}$ bar, such as below $10^{-5}$ bar, e.g. below $10^{-6}$ bar. This may be obtained by means of an evacuation cup or in a vacuum chamber (not illustrated). The evacuation may have been provided through an evacuation opening (not illustrated) in one of the glass sheets 3, 30, and this opening is subsequently sealed by means of a sealing system, e.g. comprising a low melting point glass material having the same characteristics or other characteristics as the edge sealing material 2, and/or an evacuation tube such as a glass or metal tube to be sealed by heating and melting or by mechanical deformation by a pressing unit.

In one or more embodiments of the present disclosure, the evacuation of the interior space/gap 15 between the VIG unit glass sheets may be initiated while the temperature of the edge seal material is lowered towards or at a curing temperature (Tcure) after it has been heated to melt and bond to the glass sheets 3, 30 surfaces.

The support structures 8 may e.g. have been arranged at one of the glass sheets 30, 3 before edge sealing material 2 has been applied, but in other embodiments of the present disclosure, the support structures may be distributed at the glass sheet 30 after the edge seal is applied and before the other glass sheet 30 is paired with the glass sheet 3 having the edge sealing material applied at the surface 3a.

It is generally understood that the support structures 8 are arranged in the interior space/gap 15 to maintain the gap distance between the glass sheets in the VIG unit when the gap 15 is evacuated, also in the case the gap distance between the glass sheets experience variations due to e.g. a physical impact or thermal influences. In one or more embodiments, the interior major surfaces may come into contact with support structures during or after evacuation of the interior space/gap, possibly assisted by forcing the sheets together by external means such as clamps applying a force on the exterior surfaces of the glass sheets.

In one or more embodiments of the present disclosure, the support structures 8 may comprise a height of 0.05 mm to 0.7 mm, such as 0.1 to 0.4 mm, or such as 0.15 to 0.3 mm. In one or more embodiments of the present disclosure, the support structure comprises a plurality of spacers distributed within the interior space. The spacers may have the same or different heights depending on gap size between the glass sheet. In embodiments of the present disclosure, each spacer/support structure may independently have a height of 0.05 to 0.7 mm, such as 0.1 to 0.4 mm, or such as 0.15 to 0.3 mm. The spacers can have width of 0.1 to 1 mm, such as 0.2 to 0.8 mm, or such as 0.3 to 0.7 mm.

The support structures 8 may be of any suitable material, for example solder glass, a polymer (e.g., Teflon), plastic, ceramic, glass, metal such as steel, or the like. The support structures 8 may comprise a steel or a solder glass. The spacers/support structures may in one or more embodiments be provided as a glass frit paste that is printed onto the inner surface of at least one of the two glass sheets and subsequently heated to form the spacers. Each adjacent support structure may in one or more embodiments of the present disclosure be arranged with a distance of 20 mm to 120 mm such as 25 mm to 80 mm, or such as 30 mm to 60 mm between them.

Thermally tempered glass sheets are of higher mechanical strength due to internal compressive and tensional stresses. Using tempered glass for the first 3 and second 30 glass sheets may hence help to provide that a lower amount of support structures 8 may be needed between the sheets in order to withstand the atmospheric pressure on the sheets and/or minimize bending of the sheets towards the interior space/gap between the glass sheets of the VIG unit. With tempered glass, supports structures/spacers 8 may be separated with a distance above 35 mm, such as 40 mm or above or such as 50 mm or above, between neighbouring support structures 8.

In one or more embodiments of the present disclosure, the seal material 2 may be a low melting point glass frit material and may be heated to a first temperature between 320-425 degrees Celsius, such as between 330-400 degrees Celsius, such as between 340-380 degrees Celsius or such as between 340-360 degrees Celsius, in order to bond the seal material to the surfaces to be bonded, e.g. the interior major surface of the glass sheets. In one or more embodiments the first temperature may be below 450 degrees Celsius, such as below 425 degrees Celsius.

Prior to heating to said first temperature, the seal material may be heated to a temperature of at least 250 degrees Celsius, such as at least 270 degrees Celsius to allow sintering of the material.

In one or more embodiments, the first temperature may be maintained between least 5 min-80 min, such between 15 min-75 min, such as between 25 min-65 min or such as at least 35 min. E.g. a low melting point frit material may be maintained for a time between 50-70 min at the first temperature between 360-390 degrees Celsius.

In one or more embodiments, the gap between the glass sheets 3, 30 may be evacuated while the viscosity of the seal material provides, due to the material temperature, that the edge sealing is in a deformable state, which permit the glass sheets to move towards each other without creating any undesirable internal stresses along the glass sheets during the evacuation of the interior of the gap. Furthermore, it may provide a viscosity which is sufficiently high to withstand the applied vacuum pressure and being sucked too much into the space/gap.

In one or more embodiments, the evacuation of the interior space/gap may be initiated while the temperature of the seal material 2 is lowered towards or at a curing temperature (Tcure) for the edge sealing 2.

The glass sheets 3, 30, such as thermally tempered glass sheets 3, 30, may in one or more embodiments of the present disclosure each have an average thickness between 1.5 mm and 4 mm such as between 1.8 mm and 2.2 mm, e.g. around 2 mm, measured between the parallel major surfaces of the glass sheet 3, 30.

In one or more embodiments of the present disclosure, a getter (not illustrated) may be placed in the gap 15 between the glass sheets 3, 30. This getter may comprise a reactive material and help to maintain a reduced pressure over time in the gap by absorbing/"getting" gasses that are released from e.g. the edge sealing over time. The getter may in embodiments of the present disclosure be adapted to the gasses that may be included in the heated and softened edge sealing when it is applied, so that the getter may absorb these if they are released from the edge sealing.

According to one or more embodiments of the present disclosure, the VIG unit 100 may be used in windows or doors for covering building apertures, e.g. as roof windows or windows in outer walls of a building. The VIG unit may thus be placed in a frame of a window, and a part of the frame of the window may be fixed to the wall, a roof structure and/or the like. It is however understood that the VIG unit 100 may also in further embodiments of the present disclosure be used for other applications such as windows for ovens, such as conventional house hold ovens, used for refrigerating units such as refrigerators or freezers having a glass door or lid to be opened and through which one can see the content in the oven, refrigerator or freezer.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

Figure References 1,100: Vacuum insulated glass (VIG) unit
2: Edge sealing material
2a: Stripe of edge seal
3,30: Tempered glass sheet
3a: Major glass sheet surface of a tempered glass sheet,
3b, 3c: glass sheet's end surfaces/end edge surfaces
4: Sensor system
4a: Sensor of sensor system
4c: Sensor arrangement for providing measurement of one or more parameters of applied edge sealing material
4b, 4d: Measurement input from sensor
5: Nozzle
6: Nozzle opening/outlet
7: Control system
7a: Data processor
7b: Data storage
8: Support structure
d1: dispenser distance defined between nozzle opening and glass sheet surface
9: Adjustment system for controlling the dispenser distance
10: Adjustment system for controlling relative displacement speed between nozzle(s) and glass sheet
11: adjustment system for controlling the amount of seal material dispensed by nozzle outlet per time unit
12: Transport system for supporting glass sheet
13: Distance adjustment trail for dispenser distance regulation by adjustment system 9 based on sensor input
14: Roller wave peak or valley/trough on tempered glass sheet

15: Evacuated gap in VIG unit wherein support structures such as pillars are arranged.
MD: Movement direction
20: Top surface of sealing stripe
41: Applying station
42: Support structure placement station
43: Glass sheet pairing station

The invention claimed is:

1. A method of manufacturing a vacuum insulated glass (VIG) unit including first and second tempered glass sheets, wherein the method comprises the steps of:
 applying a seal material on a glass sheet surface of at least one of the first and second tempered glass sheets comprising the steps of:
  obtaining by means of a sensor system surface variation data of the glass sheet surfaces of the first and second tempered glass sheets and storing said data for a later use,
  applying the seal material for an edge seal at the glass sheet surface by a nozzle having a nozzle opening for dispensing said seal material,
  by means of a control system, controlling an adjustment system influencing the applying of said seal material by said nozzle based on said obtained surface variation data of both the first and second tempered glass sheets;
 providing support structures on a major surface of one of the first and second tempered glass sheets,
 pairing the one of the first and second tempered glass sheets provided with said applied seal material with the other of the first and second tempered glass sheets so that the first and second tempered glass sheets are placed in parallel with interior major surfaces of the first and second tempered glass sheets facing each other and providing a gap therein between, where said support structures are placed in said gap, and
 evacuating and sealing said gap so as to provide said vacuum insulated glass unit;
 wherein said obtaining the surface variation data of both the first and second tempered glass sheets occurs prior to said applying the seal material;
 wherein, in response to said obtained surface variation data of both the first and second tempered glass sheets, said adjustment system is configured to control the amount of seal material applied per length unit at said glass sheet surface by said nozzle and is configured for varying a displacement speed of the nozzle relative to the glass sheet surface while said applying the seal material.

2. The method according to claim 1, further comprising providing a relative displacement between said glass sheet surface and said nozzle so as to facilitate said applying said seal material.

3. The method according to claim 1, wherein said control system comprises a closed loop control system configured to:
 obtain the surface variation data from the sensor of said sensor system,
 process, by means of a data processor, said obtained surface variation data based on a regulation program code stored in a data storage, and
 provide said adjustment of applying parameters based on said processing, thereby providing control of said adjustment system, influencing the applying of said seal material.

4. The method according to claim 1, wherein said adjustment systems influencing the applying of said seal material comprises a dispenser distance adjustment system configured to control a dispenser distance defined between the nozzle opening and the glass sheet surface.

5. The method according to claim 4, wherein said control of the dispenser distance is configured to be provided within an adjustment range of at least 0.2 mm.

6. The method according to claim 1, wherein said adjustment system is controlled during the applying of the seal material based on said obtained surface variation data so as to maintain a substantially constant, predefined distance between the nozzle opening and the glass sheet surface.

7. The method according to claim 1, wherein said nozzle is arranged at a dispenser distance between 0.4-3 mm from said glass sheet surface when said seal material is dispensed.

8. The method according to claim 1, wherein said adjustment system is configured to adjust the amount of seal material that is dispensed through the nozzle outlet per time unit.

9. The method according to claim 1, wherein said adjustment system is controlled so as to vary a height of the applied sealing material based on the surface variation data.

10. The method according to claim 1, wherein the amount of seal material that is applied per length for said edge seal is in the range of 0.01 g/cm (gram/centimeter) to 0.2 g/cm edge seal.

11. The method according to claim 1, wherein said sensor system comprises an optical measurement arrangement, comprising at least one of:
 a) an optical sensor and a light source,
 b) an image sensor, or
 c) a focal detection system.

12. The method according to claim 1, wherein said nozzle opening is an elongated nozzle opening.

13. The method according to claim 1, wherein a cross-sectional shape of the applied seal material is of an aspect ratio, being a ratio of width to height, that is between (5:1)-(20:1).

14. The method according to claim 1, wherein a height of the applied seal material is between 0.3-0.6 mm measured perpendicular to the glass sheet surface on which the seal material is applied.

15. The method according to claim 1, wherein said applied seal material is a low melting point solder glass material.

16. The method according to claim 14, wherein the applied seal material width is between 3-12 mm, measured along the glass sheet surface on which the seal material is applied.

* * * * *